United States Patent
Field et al.

(10) Patent No.: US 11,983,602 B1
(45) Date of Patent: May 14, 2024

(54) CONVERTING SIGNALS BETWEEN REGIMES IN A QUANTUM COMPUTING SYSTEM

(71) Applicant: Rigetti & Co, LLC, Berkeley, CA (US)

(72) Inventors: Mark Field, Campbell, CA (US); Rodney Franklyn Sinclair, El Cerrito, CA (US)

(73) Assignee: Rigetti & Co, LLC, Berkeley, CA (US)

(*) Notice: Subject to any disclaimer, the term of this patent is extended or adjusted under 35 U.S.C. 154(b) by 422 days.

(21) Appl. No.: 17/324,940

(22) Filed: May 19, 2021

Related U.S. Application Data

(60) Provisional application No. 63/027,114, filed on May 19, 2020.

(51) Int. Cl.
  *G06N 10/00* (2022.01)
  *G06F 1/20* (2006.01)

(52) U.S. Cl.
  CPC ............. *G06N 10/00* (2019.01); *G06F 1/206* (2013.01)

(58) Field of Classification Search
  USPC ................................ 716/100, 101, 102, 103
  See application file for complete search history.

(56) References Cited

U.S. PATENT DOCUMENTS

| | | | |
|---|---|---|---|
| 9,892,365 B2* | 2/2018 | Rigetti | G06F 13/4068 |
| 11,605,015 B2* | 3/2023 | Anschuetz | G06N 3/08 |
| 2021/0013391 A1* | 1/2021 | Johnson | H10N 60/124 |
| 2022/0045425 A1* | 2/2022 | Tran | H01Q 21/28 |
| 2022/0222567 A1* | 7/2022 | Reagor | G06N 10/40 |
| 2022/0415417 A1* | 12/2022 | Wang | G11C 16/3459 |

OTHER PUBLICATIONS

Balram, et al., "Coherent coupling between radiofrequency, optical and acoustic waves in piezo-optomechanical circuits", Nature Photonics, vol. 10, Mar. 28, 2016, 8 pgs.
Bochmann, et al., "Nanomechanical coupling between microwave and optical photons", Nature Physics, vol. 9, Sep. 15, 2013, 5 pgs.
(Continued)

*Primary Examiner* — Brian Ngo
(74) *Attorney, Agent, or Firm* — Henry Patent Law Firm PLLC

(57) ABSTRACT

In a general aspect, signals are converted between regimes in a quantum computing system. In some cases, a quantum computing system includes: a quantum processing unit, a control system, a transmission medium, and circuitry. The quantum processing unit includes a superconducting circuit, which includes a plurality of qubit devices. The control system includes a signal generator configured to generate a first control signal and encode qubit control information in the first control signal. The transmission medium is configured to couple the signal generator with a signal conversion system. The signal conversion system is configured to: receive the first control signal generated by the signal generator; and generate a second control signal based on the qubit control information encoded in the first control signal. The circuitry is configured to deliver the second control signal to the plurality of qubit devices.

39 Claims, 9 Drawing Sheets

(56) References Cited

OTHER PUBLICATIONS

Chi, et al., "An Approach to Photonic Generation of High-Frequency Phase-Coded RF Pulses", IEEE Photonics Technology Letters, vol. 19, No. 10, May 15, 2007, 3 pgs.
Chou, et al., "Adaptive RF-Photonic Arbitrary Waveform Generator", IEEE Photonics Technology Letters, vol. 15, No. 4, Apr. 2003, 3 pgs.
Forsch, et al., "Micorwave-to-optics conversion using a mechanical oscillator in its quantum ground state", Nature Physics, vol. 16, Oct. 7, 2019, 6 pgs.
Jiang, et al., "Efficient bidirectional piezo-optomechanical transduction between microwave and optical frequency", Nature Communications, vol. 11, Mar. 3, 2020, 7 pgs.
Mirhosseini, et al., "Superconducting qubit to optical photon transduction", Nature, vol. 588, Dec. 23, 2020, 15 pgs.
Stockill, et al., "Gallium Phosphide as a Piezoelectric Platform for Quantum Optomechanics", PhysRevLett 123, Oct. 17, 2019, 5 pgs.

\* cited by examiner

CONVERTING SIGNALS BETWEEN REGIMES IN A QUANTUM COMPUTING SYSTEM

CROSS-REFERENCE TO RELATED APPLICATIONS

This application claims priority to U.S. Provisional Application No. 63/027,114 filed May 19, 2020, and entitled "Converting Signals Between Regimes in a Quantum Computing System." The entire contents of the above-referenced priority application are hereby incorporated by reference.

BACKGROUND

The following description relates to converting signals between frequency regimes (e.g., between optical and microwave regimes, between terahertz and microwave regimes, etc.) in a quantum computing system.

Quantum computers can perform computational tasks by storing and processing information within quantum states of quantum systems. For example, qubits (i.e., quantum bits) can be stored, in and represented by, an effective two-level sub-manifold of a quantum coherent physical system. A variety of physical systems have been proposed for quantum computing applications. Examples include superconducting circuits, trapped ions, spin systems, and others.

DETAILED DESCRIPTION

Figure 1:
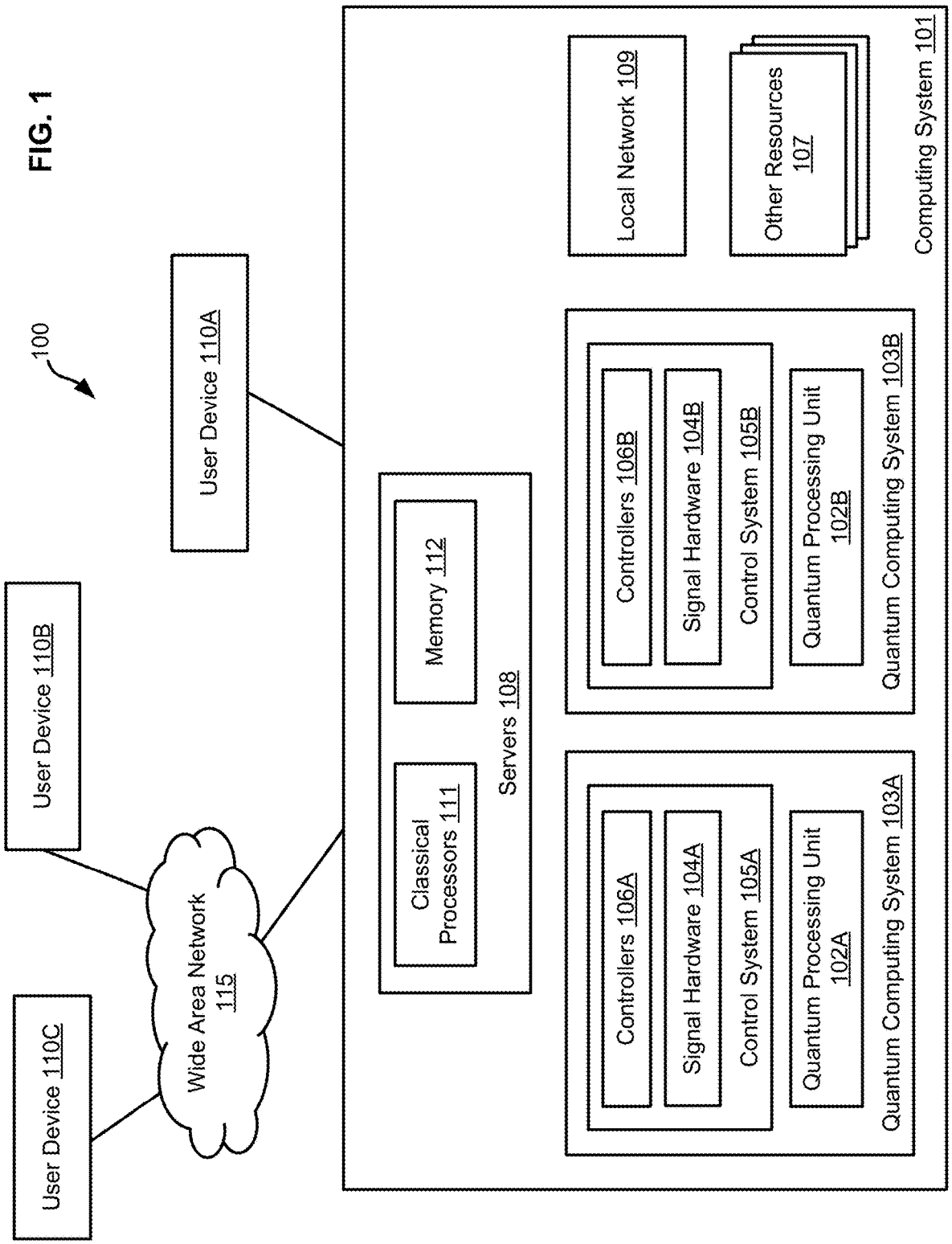
FIG. 1 is a block diagram showing aspects of an example computing environment.

In some aspects of what is described here, a quantum computing system uses distinct frequency regimes, for example, at different stages or physical domains of the quantum computing system. The quantum computing system may include signal conversion hardware to integrate the frequency regimes, for example, to convert classical control signals (e.g., to enact quantum logic operations) or few photon quantum coherent signals (e.g., to directly couple two qubits and create entanglement) between the distinct frequency regimes with high-fidelity. The use of multiple distinct frequency regimes may improve efficiency of quantum computing system components and operation (e.g., by making hardware more compact, by allowing components to operate with lower losses, etc.). For instance, as the number of qubit devices in a quantum processing unit increases, the number of circuit components (e.g., RF cables and interconnectors) and the complexity of the signal communication circuit for communicating with the qubit devices increases, which can cause increased ohmic losses and thus increased undesirable heat load to the quantum processing units operating under a cryogenic environment. In some cases, by utilizing alternative frequency regimes (e.g., optical, terahertz, or mm-wave regimes) in specific physical domains of the quantum computing system, such losses and other undesirable effects can be mitigated.

In some aspects of what is described here, a quantum computing system includes a control system configured to operate in a first frequency regime (e.g., the optical, terahertz, or mm-wave regime) and a quantum processing unit that includes one or more qubit devices configured to operate in a second, distinct frequency regime (e.g., the microwave or radio regime). In some implementations, the control system includes a signal generator, a signal receiver, and a signal conversion system, e.g., the signal hardware 204 as shown in the quantum computing system 200 in FIG. 2, that all operate in the first frequency regime. In some implementations, each of the signal generator and the signal receiver is connected with the signal conversion system through transmission links, and the signal conversion system converts signals between the first and second frequency regimes. The signal conversion system may operate on classical control signals between frequency regimes and may also operate on few photon quantum coherent signals to directly couple two qubit devices and create quantum entanglement. In some implementations, the transmission links may include one or more optical fibers or other hardware to communicate signals in the first frequency regime.

In some implementations, the methods and techniques disclosed here may reduce the use of a large number of RF coaxial cables, interconnectors, and other hardware components (e.g., filters, circulators, amplifier, etc.) in the cryogenic environment, especially when the number of qubit devices increases in the quantum processing unit. In some implementations, the transmission links may contain a transmission medium that, during operation, can introduce low signal attenuation and reduce the complexity of signal circuitry in the quantum computing system. Thus, the methods and techniques disclosed here can provide advantages, such as reduced ohmic loss and reduced heat load to the quantum computing system during a signal transmission process. Therefore, the methods and techniques disclosed here may provide a viable solution to the significant technological scaling problem in quantum computing. In some cases, a combination of these and potentially other advantages and improvements may be obtained.

In some implementations, the signal generator is used to generate first control signals defined in a first frequency regime based on control information generated by the control system. In some instances, the first frequency regime is mm-wave, terahertz, or optical regime, e.g., about $10^{11}$-$10^{16}$ Hz. In some implementations, the signal conversion system is configured to receive and convert the first control signals to second control signals defined in a second frequency regime, which can be delivered to devices in the quantum processing unit. In some implementations, the second frequency regime is a microwave or radio regime, e.g., about $10^6$-$10^{10}$ Hz or higher. In some implementations, the second control signals may be directly used to perform quantum processing tasks by operating qubit devices, readout devices, tunable couplers, or other types of components in the quantum processing unit. In some implementations, the signal conversion system may be an optical detector system, a terahertz or mm-wave detector system. For example, the signal conversion system can include one or more photo detectors, which are used to convert the first control signals received from the transmission links (e.g., optical fibers) to the second control signals. In some instances, the signal conversion system operates in the few-photon limit.

Figure 4:
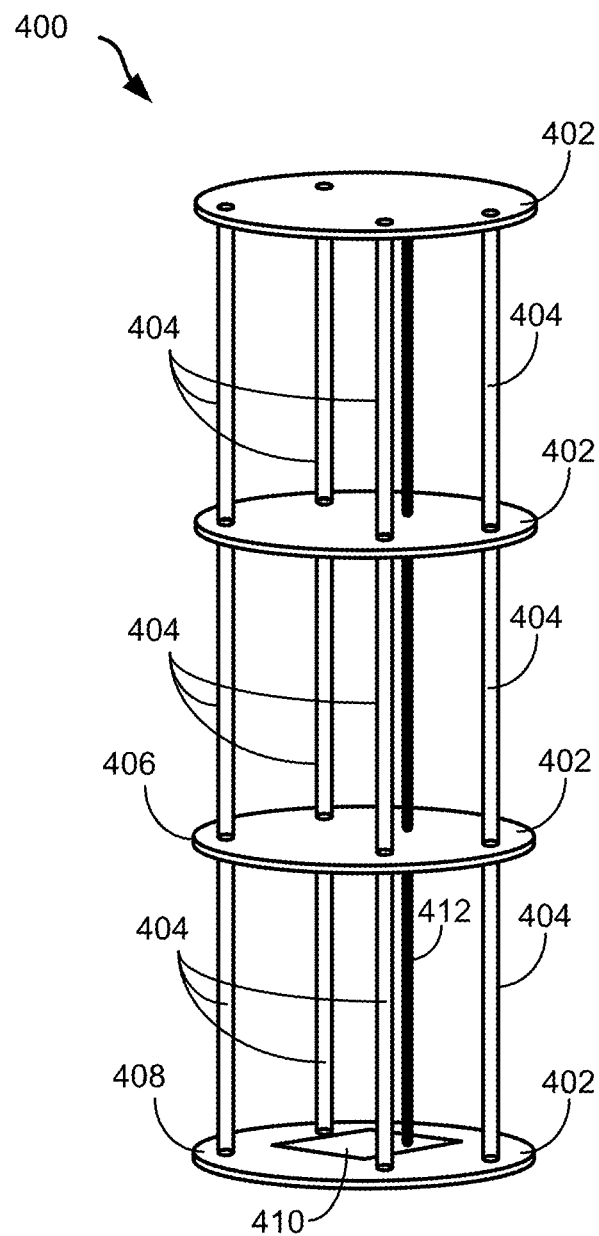
FIG. 4 is a block diagram showing aspects of an example cryostat in a quantum computing system.
Figure 5:
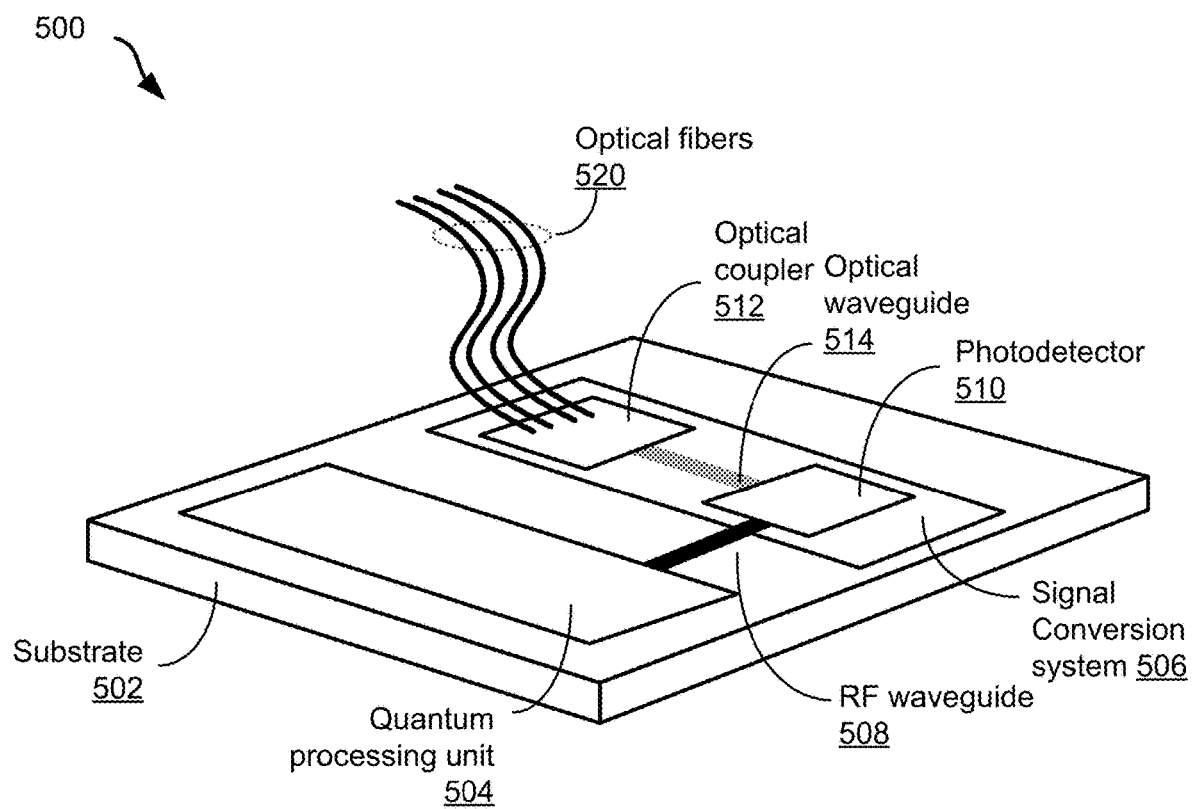
FIG. 5 is a block diagram showing aspects of an example integrated device in a quantum computing system.

In some implementations, the signal conversion system can be positioned with the quantum processing unit on a lowest-temperature thermal stage of a cryostat in the quantum computing system, e.g., the lowest-temperature thermal stage 408 of the cryostat 400 shown in FIG. 4. In some implementations, the optical fibers carrying the first control signals are used to optically couple the signal conversion system on the lowest-temperature thermal stage to the signal generator. In some implementations, the signal generator may be configured outside of insulating walls of the cryostat at a warmer temperature, e.g., room temperature. In some implementations, the signal conversion system may be integrated with the quantum processing unit on a single substrate, e.g., the integrated device 500 as shown in FIG. 5.

Figure 6:
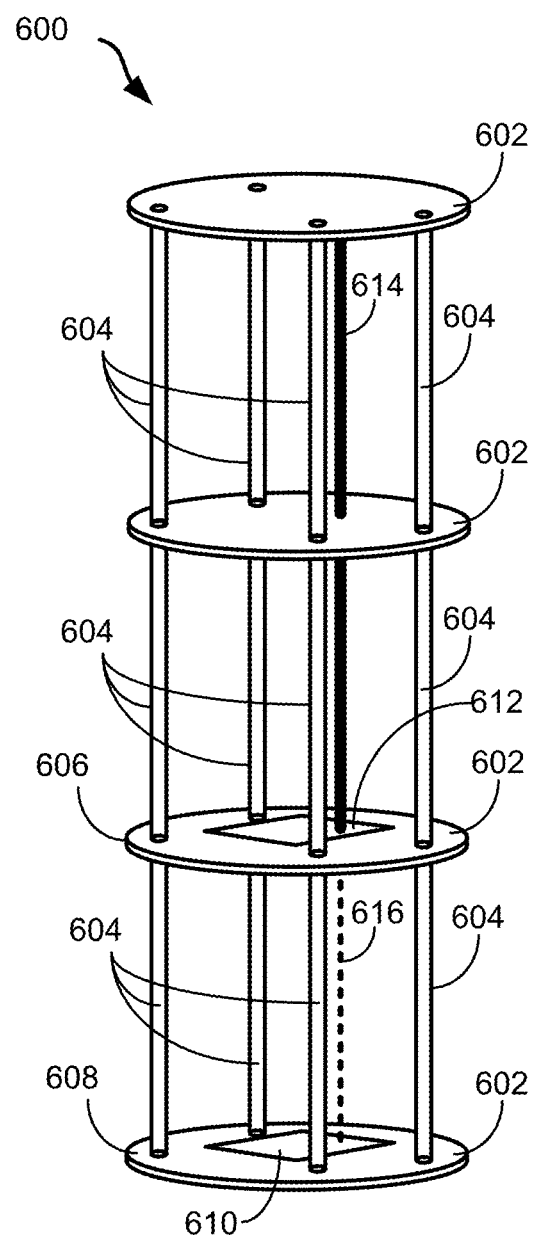
FIG. 6 is a block diagram showing aspects of an example cryostat in a quantum computing system.
Figure 7:
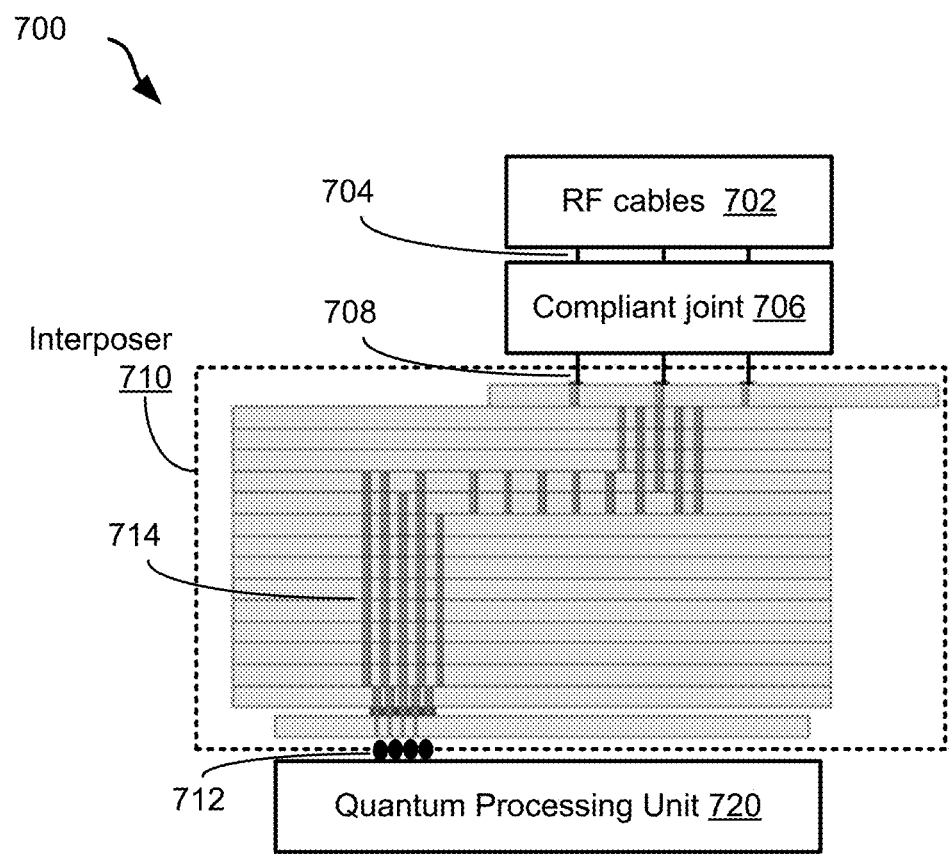
FIG. 7 shows a block diagram showing an example Radio Frequency (RF) assembly in a quantum computing system.

In some implementations, the signal conversion system can be positioned on a warmer, distinct thermal stage (e.g., the second lowest-temperature thermal stage 606 as shown in FIG. 6) and the quantum processing unit is positioned on a lowest-temperature thermal stage. In some instances, the transmission links (e.g., optical fibers) carrying the first control signals from the signal generator are routed to the signal conversion system to convert to the second control signals. In some instances, a guided RF medium carrying the second control signals is routed from the signal conversion system to the quantum processing unit, e.g., as shown in FIG. 6. In some implementations, an RF assembly, e.g., the RF assembly 700 as shown in FIG. 7, may be used to interface the guided RF medium (e.g., RF cables) with the quantum processing unit. In some implementations, the RF assembly may be configured with the quantum processing unit on the lowest-temperature thermal stage, e.g., the lowest-temperature thermal stage 608 in the cryostat 600 as shown in FIG. 6. In some implementations, the RF assembly may include compliant joints and an RF interposer. In some implementations, the RF assembly provides electrical connections to direct the second control signals from the guided RF medium to the quantum processing unit.

In some implementations, the signal conversion system can receive first response signals from the quantum processing unit after a quantum measurement is performed on the quantum processing unit. In some instances, quantum information of one or more qubit devices may be obtained from the quantum measurement and can be encoded in the first response signals operating at the second frequency. In some implementations, the first response signals may be a frequency shift of the second control signals. In some instances, the first response signals from the quantum processing unit are received via the guided RF medium through the RF assembly. In some implementations, the first response signals are amplified before being transmitted to the signal conversion system.

In some implementations, the signal conversion system converts the first response signals defined in the second frequency regime to second response signals defined in the first frequency regime. In some implementations, the second response signals may be generated by one or more laser sources in the signal conversion system. In certain examples, the second response signals may be transmitted from the signal conversion system to the signal receiver, e.g., the signal receiver 212 in the control system 205 outside of the cryogenic environment 230. In some instances, the transmission links including one or more optical fibers may be used to transmit the second response signals from the signal conversion system to the signal receiver, e.g., the transmission links 207.

In some implementations, the signal receiver can include one or more photodiodes, which may be used to decode the second response signals. In some implementations, the photodetectors may be coupled to the transmission links through a series of optical components, for example, an optical coupler and a waveguide. In some implementations, the coupling between the photodetector on the signal receiver and the optical fibers may be implemented as a signal conversion system, e.g., the signal conversion system 506 as shown in FIG. 5. In some instances, the coupling between the photodetector and the optical fiber operates in a manner to preserve quantum coherent information.

FIG. 1 is a block diagram showing aspects of an example computing environment 100. The example computing environment 100 shown in FIG. 1 includes a computing system 101 and user devices 110A, 110B, 110C. A computing environment may include additional or different features, and the components of a computing environment may operate as described with respect to FIG. 1 or in another manner.

The example computing system 101 includes classical and quantum computing resources and exposes their functionality to the user devices 110A, 110B, 110C (referred to collectively as "user devices 110"). The computing system 101 shown in FIG. 1 includes one or more servers 108, quantum computing systems 103A, 103B, a local network 109, and other resources 107. The computing system 101 may also include one or more user devices (e.g., the user device 110A) as well as other features and components. A computing system may include additional or different features, and the components of a computing system may operate as described with respect to FIG. 1 or in another manner.

The example computing system 101 can provide services to the user devices 110, for example, as a cloud-based or remote-accessed computer system, as a distributed computing resource, as a supercomputer or another type of high-performance computing resource, or in another manner. The computing system 101 or the user devices 110 may also have access to one or more other quantum computing systems (e.g., quantum computing resources that are accessible through the wide area network 115, the local network 109, or otherwise).

The user devices 110 shown in FIG. 1 may include one or more classical processors, memory, user interfaces, communication interfaces, and other components. For instance, the user devices 110 may be implemented as laptop computers, desktop computers, smartphones, tablets, or other types of computer devices. In the example shown in FIG. 1, to access computing resources of the computing system 101, the user devices 110 send information (e.g., programs, instructions, commands, requests, input data, etc.) to the servers 108; and in response, the user devices 110 receive information (e.g., application data, output data, prompts, alerts, notifications, results, etc.) from the servers 108. The user devices 110 may access services of the computing system 101 in another manner, and the computing system 101 may expose computing resources in another manner.

In the example shown in FIG. 1, the local user device 110A operates in a local environment with the servers 108 and other elements of the computing system 101. For instance, the user device 110A may be co-located with (e.g., located within 0.5 to 1 km of) the servers 108 and possibly other elements of the computing system 101. As shown in FIG. 1, the user device 110A communicates with the servers 108 through a local data connection.

The local data connection in FIG. 1 is provided by the local network 109. For example, some or all of the servers 108, the user device 110A, the quantum computing systems 103A, 103B, and the other resources 107 may communicate with each other through the local network 109. In some implementations, the local network 109 operates as a communication channel that provides one or more low-latency communication pathways from the server 108 to the quantum computer systems 103A, 103B (or to one or more of the elements of the quantum computer systems 103A, 103B). The local network 109 can be implemented, for instance, as a wired or wireless Local Area Network, an Ethernet connection, or another type of wired or wireless connection. The local network 109 may include one or more wired or wireless routers, wireless access points (WAPs), wireless mesh nodes, switches, high-speed cables, or a combination of these and other types of local network hardware elements. In some cases, the local network 109 includes a software-defined network that provides communication among virtual resources, for example, among an array of virtual machines operating on the server 108 and possibly elsewhere.

In the example shown in FIG. 1, the remote user devices 110B, 110C operate remote from the servers 108 and other elements of the computing system 101. For instance, the user devices 110B, 110C may be located at a remote distance (e.g., more than 1 km, 10 km, 100 km, 1,000 km, 10,000 km, or farther) from the servers 108 and possibly other elements of the computing system 101. As shown in FIG. 1, each of the user devices 110B, 110C communicates with the servers 108 through a remote data connection.

The remote data connection in FIG. 1 is provided by a wide area network 115, which may include, for example, the Internet or another type of wide area communication network. In some cases, remote user devices use another type of remote data connection (e.g., satellite-based connections, a cellular network, a virtual private network, etc.) to access the servers 108. The wide area network 115 may include one or more internet servers, firewalls, service hubs, base stations, or a combination of these and other types of remote networking elements. Generally, the computing environment 100 can be accessible to any number of remote user devices.

The example servers 108 shown in FIG. 1 can manage interaction with the user devices 110 and utilization of the quantum and classical computing resources in the computing system 101. For example, based on information from the user devices 110, the servers 108 may delegate computational tasks to the quantum computing systems 103A, 103B, and the other resources 107; the servers 108 can then send information to the user devices 110 based on output data from the computational tasks performed by the quantum computing systems 103A, 103B, and the other resources 107.

As shown in FIG. 1, the servers 108 are classical computing resources that include classical processors 111 and memory 112. The servers 108 may also include one or more communication interfaces that allow the servers to communicate via the local network 109, the wide area network 115, and possibly other channels. In some implementations, the servers 108 may include a host server, an application server, a virtual server, or a combination of these and other types of servers. The servers 108 may include additional or different features, and may operate as described with respect to FIG. 1 or in another manner.

The classical processors 111 can include various kinds of apparatus, devices, and machines for processing data, including, by way of example, a microprocessor, a central processing unit (CPU), a graphics processing unit (GPU), a tensor processing unit (TPU), an FPGA (field programmable gate array), an ASIC (application specific integrated circuit), or combinations of these. The memory 112 can include, for example, a random-access memory (RAM), a storage device (e.g., a writable read-only memory (ROM) or others), a hard disk, or another type of storage medium. The memory 112 can include various forms of volatile or non-volatile memory, media and memory devices, etc.

Each of the example quantum computing systems 103A, 103B operates as a quantum computing resource in the computing system 101. The other resources 107 may include additional quantum computing resources (e.g., quantum computing systems, quantum virtual machines (QVMs) or quantum simulators) as well as classical (non-quantum) computing resources such as, for example, digital microprocessors, specialized co-processor units (e.g., graphics processing units (GPUs), tensor processing units (TPUs), cryptographic co-processors, etc.), special purpose logic circuitry (e.g., field programmable gate arrays (FPGAs), application-specific integrated circuits (ASICs), etc.), systems-on-chips (SoCs), etc., or combinations of these and other types of computing modules.

In some implementations, the servers 108 generate programs, identify appropriate computing resources (e.g., a QPU or QVM) in the computing system 101 to execute the programs, and send the programs to the identified resources for execution. For example, the servers 108 may send programs to the quantum computing system 103A, the quantum computing system 103B or any of the other resources 107. The programs may include classical programs, quantum programs, hybrid classical/quantum programs, and may include any type of function, code, data, instruction set, etc.

In some instances, programs can be formatted as source code that can be rendered in human-readable form (e.g., as text) and can be compiled, for example, by a compiler running on the servers 108, on the quantum computing systems 103, or elsewhere. In some instances, programs can be formatted as compiled code, such as, for example, binary code (e.g., machine-level instructions) that can be executed directly by a computing resource. Each program may include instructions corresponding to computational tasks that, when performed by an appropriate computing resource, generate output data based on input data. For example, a program can include instructions formatted for a quantum computer system, a quantum virtual machine, a digital microprocessor, co-processor or other classical data processing apparatus, or another type of computing resource.

In some cases, a program may be expressed in a hardware-independent format. For example, quantum machine instructions may be provided in a quantum instruction language such as Quil, described in the publication "A Practical Quantum Instruction Set Architecture," arXiv: 1608.03355v2, dated Feb. 17, 2017, or another quantum instruction language. For instance, the quantum machine instructions may be written in a format that can be executed by a broad range of quantum processing units or quantum virtual machines. In some cases, a program may be expressed in high-level terms of quantum logic gates or quantum algorithms, in lower-level terms of fundamental qubit rotations and controlled rotations, or in another form. In some cases, a program may be expressed in terms of control signals (e.g., pulse sequences, delays, etc.) and parameters for the control signals (e.g., frequencies, phases, in-phase and quadrature (I-Q) data, durations, channels, etc.). In some cases, a program may be expressed in another form or format.

In some implementations, the servers 108 include one or more compilers that convert programs between formats. For example, the servers 108 may include a compiler that converts hardware-independent instructions to binary programs for execution by the quantum computing systems 103A, 103B. In some cases, a compiler can compile a program to a format that targets a specific quantum resource in the computer system 101. For example, a compiler may generate a different binary program (e.g., from the same source code) depending on whether the program is to be executed by the quantum computing system 103A or the quantum computing system 103B.

In some cases, a compiler generates a partial binary program that can be updated, for example, based on specific parameters. For instance, if a quantum program is to be executed iteratively on a quantum computing system with varying parameters on each iteration, the compiler may generate the binary program in a format that can be updated with specific parameter values at runtime (e.g., based on feedback from a prior iteration, or otherwise). In some cases, a compiler generates a full binary program that does not need to be updated or otherwise modified for execution.

In some implementations, the servers 108 generate a schedule for executing programs, allocate computing resources in the computing system 101 according to the schedule, and delegate the programs to the allocated computing resources. The servers 108 can receive, from each computing resource, output data from the execution of each program. Based on the output data, the servers 108 may generate additional programs that are then added to the schedule, output data that is provided back to a user device 110, or perform another type of action.

In some implementations, all or part of the computing environment operates as a cloud-based quantum computing (QC) environment, and the servers 108 operate as a host system for the cloud-based QC environment. The cloud-based QC environment may include software elements that operate on both the user devices 110 and the computer system 101 and interact with each other over the wide area network 115. For example, the cloud-based QC environment may provide a remote user interface, for example, through a browser or another type of application on the user devices 110. The remote user interface may include, for example, a graphical user interface or another type of user interface that obtains input provided by a user of the cloud-based QC environment. In some cases the remote user interface includes, or has access to, one or more application programming interfaces (APIs), command line interfaces, graphical user interfaces, or other elements that expose the services of the computer system 101 to the user devices 110.

In some cases, the cloud-based QC environment may be deployed in a "serverless" computing architecture. For instance, the cloud-based QC environment may provide on-demand access to a shared pool of configurable computing resources (e.g., networks, servers, storage, applications, services, quantum computing resources, classical computing resources, etc.) that can be provisioned for requests from user devices 110. Moreover, the cloud-based computing systems 104 may include or utilize other types of computing resources, such as, for example, edge computing, fog computing, etc.

In an example implementation of a cloud-based QC environment, the servers 108 may operate as a cloud provider that dynamically manages the allocation and provisioning of physical computing resources (e.g., GPUs, CPUs, QPUs, TPUs, etc.). Accordingly, the servers 108 may provide services by defining virtualized resources for each user account. For instance, the virtualized resources may be formatted as virtual machine images, virtual machines, containers, or virtualized resources that can be provisioned for a user account and configured by a user. In some cases, the cloud-based QC environment is implemented using a resource such as, for example, OPENSTACK®. OPENSTACK® is an example of a software platform for cloud-based computing, which can be used to provide virtual servers and other virtual computing resources for users.

In some cases, the server 108 stores quantum machine images (QMI) for each user account. A quantum machine image may operate as a virtual computing resource for users of the cloud-based QC environment. For example, a QMI can provide a virtualized development and execution environment to develop and run programs (e.g., quantum programs or hybrid classical/quantum programs). When a QMI operates on the server 108, the QMI may engage either of the quantum processing unit units 102A, 102B, and interact with a remote user device (110B or 110C) to provide a user programming environment. The QMI may operate in close physical proximity to, and have a low-latency communication link with, the quantum computing systems 103A, 103B. In some implementations, remote user devices connect with QMIs operating on the servers 108 through secure shell (SSH) or other protocols over the wide area network 115.

In some implementations, all or part of the computing system 101 operates as a hybrid computing environment. For example, quantum programs can be formatted as hybrid classical/quantum programs that include instructions for execution by one or more quantum computing resources and instructions for execution by one or more classical resources. The servers 108 can allocate quantum and classical computing resources in the hybrid computing environment, and delegate programs to the allocated computing resources for execution. The quantum computing resources in the hybrid environment may include, for example, one or more quantum processing units (QPUs), one or more quantum virtual machines (QVMs), one or more quantum simulators, or possibly other types of quantum resources. The classical computing resources in the hybrid environment may include, for example, one or more digital microprocessors, one or more specialized co-processor units (e.g., graphics processing units (GPUs), cryptographic co-processors, tensor processing units (TPUs), etc.), special purpose logic circuitry (e.g., field programmable gate arrays (FPGAs), application-specific integrated circuits (ASICs), etc.), systems-on-chips (SoCs), or other types of computing modules.

In some cases, the servers 108 can select the type of computing resource (e.g., quantum or classical) to execute an individual program, or part of a program, in the computing system 101. For example, the servers 108 may select a particular quantum processing unit (QPU) or other computing resource based on availability of the resource, speed of the resource, information or state capacity of the resource, a performance metric (e.g., process fidelity) of the resource, or based on a combination of these and other factors. In some cases, the servers 108 can perform load balancing, resource testing and calibration, and other types of operations to improve or optimize computing performance.

Each of the example quantum computing systems 103A, 103B shown in FIG. 1 can perform quantum computational tasks by executing quantum machine instructions (e.g., a binary program compiled for the quantum computing system). In some implementations, a quantum computing system can perform quantum computation by storing and manipulating information within quantum states of a composite quantum system. For example, qubits (i.e., quantum bits) can be stored in and represented by an effective two-level sub-manifold of a quantum coherent physical system. In some instances, quantum logic can be executed in a manner that allows large-scale entanglement within the quantum system. Control signals can manipulate the quantum states of individual qubits and the joint states of multiple qubits. In some instances, information can be read out from the composite quantum system by measuring the quantum states of the qubits. In some implementations, the quantum states of the qubits are read out by measuring the transmitted or reflected signal from auxiliary quantum devices that are coupled to individual qubits.

In some implementations, a quantum computing system can operate using gate-based models for quantum computing. For example, the qubits can be initialized in an initial state, and a quantum logic circuit comprised of a series of quantum logic gates can be applied to transform the qubits and extract measurements representing the output of the quantum computation. Individual qubits may be controlled by single-qubit quantum logic gates, and pairs of qubits may be controlled by two-qubit quantum logic gates (e.g., entangling gates that are capable of generating entanglement between the pair of qubits). In some implementations, a quantum computing system can operate using adiabatic or annealing models for quantum computing. For instance, the qubits can be initialized in an initial state, and the controlling Hamiltonian can be transformed adiabatically by adjusting control parameters to another state that can be measured to obtain an output of the quantum computation.

In some models, fault-tolerance can be achieved by applying a set of high-fidelity control and measurement operations to the qubits. For example, quantum error correcting schemes can be deployed to achieve fault-tolerant quantum computation. Other computational regimes may be used; for example, quantum computing systems may operate in non-fault-tolerant regimes. In some implementations, a quantum computing system is constructed and operated according to a scalable quantum computing architecture. For example, in some cases, the architecture can be scaled to a large number of qubits to achieve large-scale general-purpose coherent quantum computing. Other architectures may be used; for example, quantum computing systems may operate in small-scale or non-scalable architectures.

The example quantum computing system 103A shown in FIG. 1 includes a quantum processing unit 102A and a control system 105A, which controls the operation of the quantum processing unit 102A. Similarly, the example quantum computing system 103B includes a quantum processing unit 102B and a control system 105B, which controls the operation of a quantum processing unit 102B. A quantum computing system may include additional or different features, and the components of a quantum computing system may operate as described with respect to FIG. 1 or in another manner.

In some instances, all or part of the quantum processing unit 102A functions as a quantum processing unit, a quantum memory, or another type of subsystem. In some examples, the quantum processing unit 102A includes a quantum circuit system. The quantum circuit system may include qubit devices, readout devices, and possibly other devices that are used to store and process quantum information. In some cases, the quantum processing unit 102A includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processing unit 102A. In some cases, the quantum processing unit 102A includes an ion trap system, and the qubit devices are implemented as trapped ions controlled by optical signals delivered to the quantum processing unit 102A. In some cases, the quantum processing unit 102A includes a spin system, and the qubit devices are implemented as nuclear or electron spins controlled by microwave or radio-frequency signals delivered to the quantum processing unit 102A. In some instances, the quantum processing unit 102A includes an optical processing unit with one or more single- or few-photon sources that output photons to one or more single-photon detectors via waveguide interferometers. Light is split onto two branches of a waveguide interferometer and recombined before arriving at a single-photon detector. A phase difference caused by a phase shifting element on one of the two branches of the waveguide interferometer creates an interference. The quantum processing unit 102A may be implemented based on another physical modality of quantum computing.

In some cases, the quantum processing unit 102A may include optomechanical transducers for transducing signals between the microwave and optical regimes in the single- or few-photon regimes and allowing for transduction of a quantum state between the microwave and optical frequency regimes. In some instances, an optomechanical transducer can be implemented using the systems and techniques described in the following publications:

Joerg Bochmann, Amit Vainsencher, David D. Awschalom, and Andrew N. Cleland, Nanomechanical Coupling between Microwave and Optical Photons, Nature Physics, vol 9, pages 712-716, Sep. 15, 2013, which is hereby incorporated by reference.

Krishna C. Balram, Marcelo I. Davanco, Jin Dong Song, and Kartik Srinivasan, Coherent coupling between radiofrequency, Optical and Acoustic Waves in Piezo-optomechanical Circuits, Nature Photonics, vol. 10, pages 346-353, Mar. 28, 2016, which is hereby incorporated by reference.

Moritz Forsch, Robert Stockill, Andreas Wallucks, Igor Marinković, Claus Gärtner, Richard A. Norte, Frank van Otten, Andrea Fiore, Kartik Srinivasan, and Simon Gröblacher, Microwave-to-optics Conversion using a Mechanical Oscillator in its Quantum Ground State, Nature Physics, vol. 16, pages 69-74, Oct. 7, 2019, which is hereby incorporated by reference.

Robert Stockill, Moritz Forsch, Gregoire Beaudoin, Konstantinos Pantzas, Isabelle Sagnes, Remy Braive, and Simon Gröblacher, Gallium Phosphide as a Piezoelectric Platform for Quantum Optomechanics, Physical Review Letters, vol. 123, 163602, Oct. 19, 2019, which is hereby incorporated by reference.

Wentao Jiang, Christopher J. Sarabalis, Yanni D. Dahmani, Rishi N. Patel, Felix M. Mayor, Timothy P. McKenna, Raphaël Van Laer, and Amir H. Safavi-Naeini, Efficient Bidirectional Piezo-optomechanical Transduction between Microwave and Optical Frequency, Nature Communications, vol. 11, 1166, Mar. 3, 2020, which is hereby incorporated by reference.

Mohammad Mirhosseini, Alp Sipahigil, Mahmoud Kalaee, and Oskar Painter, Superconducting Qubit to Optical Photon Transduction, Nature, vol. 588, pages 599-603, Dec. 23, 2020, which is hereby incorporated by reference.

The publications listed above are provided as examples; in some cases, the optomechanical transducer can be implemented in another manner.

The quantum processing unit 102A may include, or may be deployed within, a controlled environment. The controlled environment can be provided, for example, by shielding equipment, cryogenic equipment, and other types of environmental control systems. In some examples, the components in the quantum processing unit 102A operate in a cryogenic temperature regime and are subject to very low electromagnetic and thermal noise. For example, magnetic shielding can be used to shield the system components from stray magnetic fields, optical shielding can be used to shield the system components from optical noise, thermal shielding and cryogenic equipment can be used to maintain the system components at controlled temperature, etc.

In some implementations, the example quantum processing unit 102A can process quantum information by applying control signals to the qubits in the quantum processing unit 102A. The control signals can be configured to encode information in the qubits, to process the information by performing quantum logic gates or other types of operations, or to extract information from the qubits. In some examples, the operations can be expressed as single-qubit quantum logic gates, two-qubit quantum logic gates, or other types of quantum logic gates that operate on one or more qubits. A quantum logic circuit, which includes a sequence of quantum logic operations, can be applied to the qubits to perform a quantum algorithm. The quantum algorithm may correspond to a computational task, a hardware test, a quantum error correction procedure, a quantum state distillation procedure, or a combination of these and other types of operations.

The example control system 105A includes controllers 106A and signal hardware 104A. Similarly, control system 105B includes controllers 106B and signal hardware 104B. All or part of the control systems 105A, 105B can operate in a room-temperature environment or another type of environment, which may be located near the respective quantum processing units 102A, 102B. In some cases, the control systems 105A, 105B include classical computers, signaling equipment (microwave, radio, optical, bias, etc.), electronic systems, vacuum control systems, refrigerant control systems, or other types of control systems that support operation of the quantum processing units 102A, 102B.

The control systems 105A, 105B may be implemented as distinct systems that operate independent of each other. In some cases, the control systems 105A, 105B may include one or more shared elements; for example, the control systems 105A, 105B may operate as a single control system that operates both quantum processing units 102A, 102B. Moreover, a single quantum computer system may include multiple quantum processing units, which may operate in the same controlled (e.g., cryogenic) environment or in separate environments.

The example signal hardware 104A includes components that communicate with the quantum processing unit 102A. The signal hardware 104A may include, for example, waveform generators, amplifiers, digitizers, high-frequency sources, DC sources, AC sources, etc. The signal hardware may include additional or different features and components. In the example shown, components of the signal hardware 104A are adapted to interact with the quantum processing unit 102A. For example, all or part of the signal hardware 104A can be configured to operate in one or more particular frequency regimes, configured to generate and process signals in one or more particular formats, or the hardware may be adapted in another manner. In some instances, all or part of the signal hardware 104A can be configured to operate in one or more environment (e.g., atmospheric, warm-temperature environment, or cryogenic environment). In some instances, the signal hardware 104A may be implemented as shown in FIGS. 2-7 or in another manner.

In some instances, one or more components of the signal hardware 104A generate control signals, for example, based on control information from the controllers 106A. The control signals can be delivered to the quantum processing unit 102A during operation of the quantum computing system 103A. For instance, the signal hardware 104A may include a signal generator which generates first control signals defined in a first frequency regime (e.g., a mm-wave, terahertz, or optical regime). The first control signals may be delivered to a signal conversion system of the signal hardware 104A via transmission links designed for carrying signals in the first frequency regime. For example, the transmission links can be optical fibers. The first control signals defined in the first frequency regime may be converted to second control signals defined in the second frequency regime (e.g., a microwave or radio regime). The second control signals may be directly delivered to the quantum processing unit 102A to implement quantum logic operations, readout operations or other types of operations. As an example, the signal hardware 104A may include laser systems that generate optical waveforms (e.g., the first control signals) and the signal hardware 104A may include photodetection systems that convert the optical waveforms to electromagnetic waveforms (e.g., the second control signals).

In some instances, the signal hardware 104A receives and processes response signals from the quantum processing unit 102A. The received response signals can be generated by the execution of a quantum program on the quantum computing system 103A. For instance, the signal hardware 104A may receive response signals from the devices in the quantum processing unit 102A in response to readout or other operations performed by the quantum processing unit 102A. For example, first response signals in the second frequency regime (e.g., the microwave or radio regime) generated from the quantum processing unit 102A can be processed by the signal hardware 104A. In some instances, the first response signals may be amplified and converted to second response signals defined in the first frequency regime (e.g., the mm-wave, terahertz or optical regime) by the signal conversion system of the signal hardware 104A. The second response signals may be delivered to a signal receiver of the signal hardware 104A via the transmission links, where the quantum information can be extracted, and the extracted quantum information can be provided to the controllers 106A or handled in another manner. In some examples, the signal hardware 104A may include a digitizer that digitizes electromagnetic waveforms (e.g., the microwave or radio regime) or optical signals, and a digitized waveform can be delivered to the controllers 106A or to other signal hardware components. In some instances, the controllers 106A process the information from the signal hardware 104A and provide feedback to the signal hardware 104A; based on the feedback, the signal hardware 104A can in turn generate new control signals that are delivered to the quantum processing unit 102A.

In some implementations, the signal hardware 104A includes signal delivery hardware that interfaces with the quantum processing unit 102A. For example, the signal hardware 104A may include filters, attenuators, directional couplers, multiplexers, diplexers, bias components, signal channels, isolators, amplifiers, power dividers, and other types of components. In some instances, the signal delivery hardware performs preprocessing, signal conditioning, signal conversion, or other operations to the control signals to be delivered to the quantum processing unit 102A. In some instances, signal delivery hardware performs preprocessing, signal conditioning, or other operations on readout signals received from the quantum processing unit 102A. For example, the signal delivery hardware of the signal hardware 104A may be implemented as shown in FIGS. 2-7 or in another manner.

The example controllers 106A communicate with the signal hardware 104A to control operation of the quantum computing system 103A. The controllers 106A may include classical computing hardware that directly interface with components of the signal hardware 104A. The example controllers 106A may include classical processors, memory, clocks, digital circuitry, analog circuitry, and other types of systems or subsystems. The classical processors may include one or more single- or multi-core microprocessors, digital electronic controllers, special purpose logic circuitry, e.g., an FPGA (field programmable gate array) or an ASIC (application specific integrated circuit), or other types of data processing apparatus. The memory may include any type of volatile or non-volatile memory or another type of computer storage medium. The controllers 106A may also include one or more communication interfaces that allow the controllers 106A to communicate via the local network 109 and possibly other channels. The controllers 106A may include additional or different features and components.

In some implementations, the controllers 106A include memory or other components that store quantum state information, for example, based on qubit readout operations performed by the quantum computing system 103A. For instance, the states of one or more qubits in the quantum processing unit 102A can be measured by qubit readout operations, and the measured state information can be stored in a cache or other type of memory system in one or more of the controllers 106A. In some cases, the measured state information is subsequently used in the execution of a quantum program, a quantum error correction procedure, a quantum processing unit (QPU) calibration or testing procedure, or another type of quantum process.

In some implementations, the controllers 106A include memory or other components that store a quantum program containing quantum machine instructions for execution by the quantum computing system 103A. In some instances, the controllers 106A can interpret the quantum machine instructions and perform hardware-specific control operations according to the quantum machine instructions. For example, the controllers 106A may cause the signal hardware 104A to generate control signals that are delivered to the quantum processing unit 102A to execute the quantum machine instructions.

In some instances, the controllers 106A extract qubit state information from qubit readout signals, for example, to identify the quantum states of qubits in the quantum processing unit 102A or for other purposes. For example, the controllers may receive the qubit readout signals (e.g., in the form of analog waveforms) from the signal hardware 104A, digitize the qubit readout signals, and extract qubit state information from the digitized signals. In some cases, the controllers 106A compute measurement statistics based on qubit state information from multiple shots of a quantum program. For example, each shot may produce a bit-string representing qubit state measurements for a single execution of the quantum program, and a collection of bit-strings from multiple shots may be analyzed to compute quantum state probabilities.

In some implementations, the controllers 106A include one or more clocks that control the timing of operations. For example, operations performed by the controllers 106A may be scheduled for execution over a series of clock cycles, and clock signals from one or more clocks can be used to control the relative timing of each operation or groups of operations. In some implementations, the controllers 106A may include classical computer resources that perform some or all of the operations of the servers 108 described above. For example, the controllers 106A may operate a compiler to generate binary programs (e.g., full or partial binary programs) from source code; the controllers 106A may include an optimizer that performs classical computational tasks of a hybrid classical/quantum program; the controllers 106A may update binary programs (e.g., at runtime) to include new parameters based on an output of the optimizer, etc.

The other quantum computer system 103B and its components (e.g., the quantum processing unit 102B, the signal hardware 104B, and controllers 106B) can be implemented as described above with respect to the quantum computer system 103A; in some cases, the quantum computer system 103B and its components may be implemented or may operate in another manner.

In some implementations, the quantum computer systems 103A, 103B are disparate systems that provide distinct modalities of quantum computation. For example, the computer system 101 may include both an adiabatic quantum computer system and a gate-based quantum computer system. As another example, the computer system 101 may include a superconducting circuit-based quantum computer system and an ion trap-based quantum computer system. In such cases, the computer system 101 may utilize each quantum computing system according to the type of quantum program that is being executed, according to availability or capacity, or based on other considerations.

Figure 2:
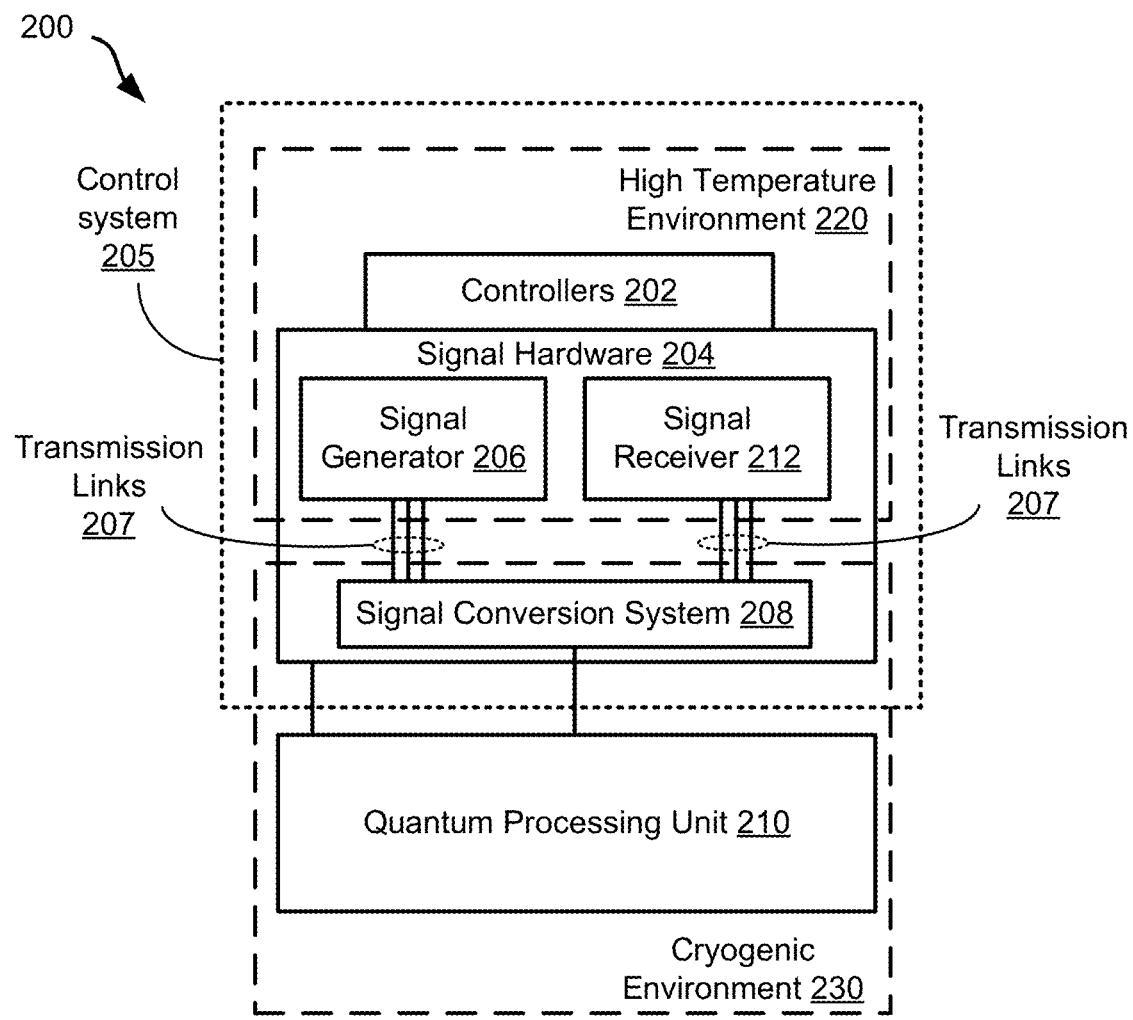
FIG. 2 is a block diagram showing aspects of an example quantum computing system

FIG. 2 is a block diagram showing aspects of an example quantum computing system 200. As shown in FIG. 2, the example quantum computing system 200 includes a control system 205 and a quantum processing unit 210. The control system 205 includes a controller 202, and signal hardware 204. In some implementations, the control system 205 may include classical computers, electronic systems, vacuum control systems, refrigerant control systems, or other types of control systems to support operation of the quantum processing units 210. In some implementations, the control system 205 may be implemented as the control system 105 shown in FIG. 1. In certain implementations, a quantum computing system 200 may include additional or different features or components, and the components of the quantum computing system 200 may operate as described with respect to FIG. 2 or another manner.

In the example shown in FIG. 2, the signal hardware 204 includes a signal generator 206, a signal receiver 212, and a signal conversion system 208. In some implementations, each of the signal generator 206 and the signal receiver 212 is coupled with the signal conversion system 208 through transmission links 207. In some implementations, the transmission links 207 include one or more optical fibers. In some instances, the optical fibers may include one or more single-mode optical fibers, one or more multi-mode optical fibers, or a combination.

In some implementations, the signal generator 206 and the signal receiver 212 in the signal hardware 204 can generate signals defined in a first frequency regime. In some instances, the first frequency regime is a mm-wave, terahertz or optical regime, e.g., about $10^{11}$-$10^{16}$ Hz. In some implementations, the signal hardware 204 may include signaling equipment, which may generate or receive other types of signals including microwave, radio, and electrical signals to various control subsystems in the control system 205. In some implementations, the signal hardware 204 may include additional and different features or components. In some implementations, the signal hardware 204 may be implemented as the signal hardware 104 in the quantum computing system 103 as shown in FIG. 1. In some implementations, the signal hardware 204 may be adapted in another manner.

In some implementations, the signal generator 206 can be used to generate first control signals defined in the first frequency regime based on control information from the controllers 202. In some implementations, the signal conversion system 208 may be configured to receive and convert the first control signals to second control signals defined in a second frequency regime, which can be delivered to devices in the quantum processing unit 210. In some implementations, the second control signals may be used to perform quantum processing by operating qubits, readout devices, tunable couplers, or other types of components in the quantum processing unit 210. In some implementations, the second regime is a microwave or radio regime, e.g., about $10^6$-$10^{10}$ Hz.

In some implementations, the signal generator 206 may include a series of optical elements which are used to generate the first control signals that carry the control information. In some examples, the signal generator may include a laser source and other optical components such as, for example lenses, mirrors, diffusers, filters, polarization modifier, amplifier, phase modulator, Bragg gratings, attenuators, photonic crystals, and multiplexer. In some implementations, the signal generator 206 may provide phase modulation, frequency modulation and amplitude modulation to the first control signals. In some implementations, the signal generator 206 may further output the first control signals through the transmission links 207 to the signal conversion system 208.

In some implementations, the signal generator 206 may include multiple lasers generating multiple first control signals defined in distinct sub-regimes within the first frequency regime. In some implementations, a multiplexer may be used to combine the multiple first control signals from the multiple lasers and transmit multiplexed first control signals through the transmission links 207 to the signal conversion system 208.

Figure 3:
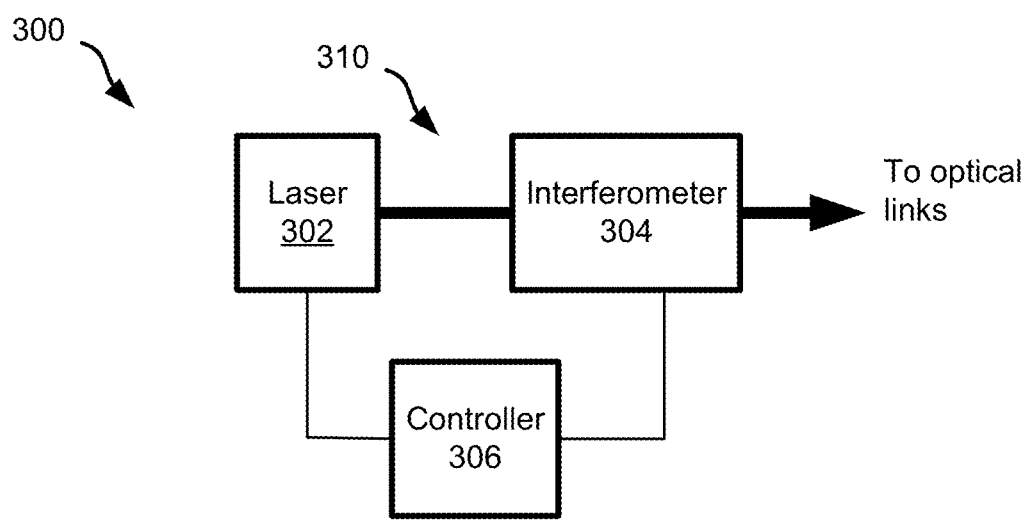
FIG. 3 is a block diagram showing aspects of an example signal generator in a quantum computing system.

In some implementations, the signal conversion system 208 may be an optical detector system or a mm-wave or terahertz detector system. In some instances, the signal conversion system 208 includes one or more photodetectors, which are used to convert the first control signals received from the transmission links 207 to the second control signals. In some examples, the signal conversion system 208 may have a demultiplexer on which the multiplexed first control signals may be demultiplexed. In some instances, the photodetectors in the signal conversion system 208 may have fast response in the terahertz or optical regime. In some implementations, the signal conversion system 208 is integrated with the quantum processing unit 210, e.g., the integrated device 300 as shown in FIG. 3. In some implementations, the signal conversion system 208 may include other optical components, such as optical couplers and waveguides. In some example, the signal conversion system 208 may include additional or different optical components and may be configured in another manner.

As shown in the example quantum computing system 200 in FIG. 2, different subsystems of the quantum computing system 200 may operate in different environments. For example, the controller 202, the signal generator 206, and the signal receiver 212 of the signal hardware 204 may operate in a warm temperature environment 220 (e.g., room-temperature environment). For example, the signal conversion system 208 of the signal hardware 204 and the quantum processing unit 210 may operate in a cryogenic environment 230. In some implementations, the cryogenic environment 230 may be provided by the cryostats 400 and 600 as shown in FIGS. 4 and 6 or in another manner. In some implementations, the signal conversion system 208 may be configured with the quantum processing unit 230 on a lowest-temperature thermal stage of the cryogenic environment 230. In some implementations, the signal conversion system 208 may be configured on a different thermal stage of the cryostat (e.g., the second lowest temperature thermal stage of the cryogenic environment 230).

In some implementations, the signal conversion system 208 can receive first response signals from the quantum processing unit 210. In some implementations, the first response signals are defined in the second frequency regime (e.g., the microwave or radio regime). In some implementations, the first response signals may be generated by performing a quantum measurement on the quantum processing unit 210 after execution of the quantum processing tasks. In some implementations, quantum information from one or more qubit devices can be encoded on the first response signals and the first response signals are converted to second response signals which are defined in the first frequency regime (e.g., mm-wave, terahertz or optical regime). In some implementations, the signal conversion system 208 may include one or more laser sources, which may be driven by the first response signals and used to convert the first response signals to the second response signals. In some implementations, the second response signals may be transmitted back to the signal receiver 212 through the transmission links 207. In some examples, the quantum information on the second response signals may be extracted by the signal receiver 212 and provided to the controllers 202 or to be handled in another manner. In some instances, the controllers 202 may process the response information and provide feedback to the signal hardware 204; based on the feedback, the signal hardware 204 can in turn generate new control signals that are delivered to the quantum processing unit 210 through the signal generator 206 and the signal conversion system 208; and may also receive new response signals from the quantum processing unit 210 through the signal conversion system 208 and the signal receiver 212.

FIG. 3 is a block diagram showing aspects of an example signal generator 300 in a quantum computing system. In some implementations, the example signal generator 300 may be used for generating first control signals defined in a first frequency regime, e.g., a mm-wave, terahertz, or optical regime (about $10^{11}$-$10^{16}$ Hz). In some implementations, the first control signals may be guided to a signal conversion system through transmission links, e.g., the signal conversion system 208 through the transmission links 207 as shown in FIG. 2. In some implementations, the signal generator 300 may include one or more optical elements defining one or more pathways 310. In some implementations, the signal generator 300 may include additional and different features or components and components of the signal generator 300 may be implemented in another manner.

In the example shown in FIG. 3, the signal generator 300 includes a laser 302, an interferometer 304, and a controller 306. In some implementations, the laser 302 may be implemented as a mode-locked femtosecond pulsed laser to generate ultrashort optical pulses or in different manner. In some implementations, the ultrashort optical pulses are transform-limited Gaussian pulses. In some implementations, the controller 306 may include a pattern generator, which is synchronized to the laser 302 and is used to perform phase encoding to generate phase encoded control signals. In some implementations, the phase-encoded control signal may have a spatially dependent phase. In some instances, different frequency components in the optical signal may be spread out into pixels across a plane, for example using diffraction gratings. In some instances, the phase and amplitude of the optical signal with different frequencies passing through each of the pixels may be changed by the spatial light modulator. In some instances, all of the light from the pixels are combined into a single optical fiber to form an optical pulse with the modulation which may be detected by the photodetector to produce the RF pulses. In some implementations, the ultrashort pulses generated by the laser 302 are guided to the interferometer 304. In some implementations, the laser source 302 is coupled to the interferometer 304 through a dispersive element. In some examples, the dispersive element may be a length of standard single-mode fiber. In this case, when passing through the single-mode fiber, the ultrashort pulses from the laser source 302 can be broadened and chirped as a result of interactions with the dispersion properties of the optical fiber.

In some implementations, the interferometer 304 may be an unbalanced Mach-Zehnder interferometer. In some instances, the unbalanced Mach-Zehnder interferometer may include two beam splitters, two mirrors, a polarization modifier, and a phase modulator. In some implementations, an incident optical beam is split by a first beam splitter into two paths and each of the two paths is reflected by a mirror. In some implementations, a first path may be directed through the polarization modifier and a second path may be directed through the phase modulator. In some implementations, the phase modulator may be controlled by the controller 306 using an RF amplifier. In some implementations, the phase modulator on the second optical path is used for introducing a time-delay to the ultrashort pulses on the second path. In some implementations, the polarization modifier may be used to modify the polarization of the ultrashort pulses on the first path. In some instances, laser signals on the two paths are recombined on a second beam splitter of the unbalanced Mach-Zehnder interferometer and output the first control signals. In some implementations, the first control signals from the interferometer may be transmitted through transmission links to a signal conversion system, which can be used to generate second control signals defined in a second frequency regime, e.g., the microwave or radio regime. In some instances, a time delay between the two ultrashort pulses on the first and second paths may be used for determining frequencies of the second control signals.

In some instances, one of the two paths of the Mach-Zehnder interferometer has a delay line which forces the ultrashort pulses on the first path to interfere with a time-delayed ultrashort pulse on the second path. In some instances, the optical frequency changes in time as the pulse interferes and recombines. For example, if one of the pulses is time-delayed, there is a constant difference in frequency between these two ultrashort pulses on the two paths, even though their individual frequencies are changing in time due to the linear chirp. Interfering the two ultrashort pulses of different frequencies on the two paths results in a beat frequency, e.g., a modulation of the amplitude of the combined ultrashort pulse at a difference frequency. In some examples, the difference in frequency can be in the radio frequency regime, e.g., about 4 GHz or in another frequency range, generating an optical pulse with an amplitude modulation in the radio frequency regime. In some instances, a fast photodetector may respond to the intensity of light at RF frequencies generating an electrical signal at RF frequencies. In some instances, the amount of frequency shift between the two ultrashort pulses depends on the amount of chirp set by the dispersive element and the time delay which can be programmed. The frequency shift may be tuned within limits set by the amount of chirp and the length of the ultrashort pulse. The frequency of the RF pulse is expressed as:

$$f_c = \frac{\Delta t}{2\pi \ddot{\Phi}}$$

where $\Delta t$ is the time delay, and $\ddot{\Phi}$ is the first order dispersion.

In some implementations, the laser 302 may include a quantum cascade laser to generate the first control signals with ultrashort pulses in the terahertz regime. In some implementations, the quantum cascade laser may include a series of periodic thin layers with varying material compositions, e.g., a superlattice. In some implementations, the quantum cascade laser may be used for generating terahertz pulses in a cryogenic environment, e.g., on the second lowest-temperature thermal stages 406, 606 in the cryostats 400, 600 as shown in FIGS. 4 and 6. In some implementations, the quantum cascade laser may operate at a frequency in a frequency range of $10^{12}$-$10^{13}$ Hz. In some implementations, the frequency range may be determined by the structure of the superlattice in the quantum cascade laser. In some implementations, the frequency of the quantum cascade laser may be tuned by the controller 306. In some implementations, the laser 302 may include multiple quantum cascade lasers, each of which operates at a different frequency. In some examples, pulses generated by the multiple quantum cascade lasers in the signal generator 300 may be combined by an optical multiplexer to form the first control signals.

FIG. 4 is a block diagram showing aspects of an example cryostat 400 in a quantum computing system. As shown in FIG. 4, the example cryostat 400 may include one or more thermal stages 402. In some implementations, the example cryostat 400 may be used to expose devices and samples to environments of very low temperature (e.g., T<120 K). In some implementations, such environments are thermally isolated through insulating walls and are evacuated, typically having a pressure in the range of $10^{-3}$ mbar to $10^{-9}$ mbar, thereby allowing the example cryostat 400 to operate at stable temperatures without appreciable thermal losses.

In some implementations, the one or more thermal stages 402 may correspond to radiation shields, thermalization plates, or both. In some instances, a thermal stage 402 in a cryostat 400 may be formed of a material having a high thermal conductivity at cryogenic temperatures, such as below 120 K. For example, a thermal stage 402 may be formed of a material having a thermal conductivity of at least 1 W/(mK) as measured at 4 K. In some examples, a high thermal conductivity allows the thermal stage 402 to mitigate the development of temperature gradients, thereby maintaining a substantially uniform temperature across their respective masses. In some implementations, such material in a thermal stage 402 may include oxygen-free high conductivity copper and its alloys, including a C101 copper alloy or a beryllium-copper alloy (e.g., Cu with 0.5-3% Be) or another type of alloy.

In some implementations, the cryostat 400 may include any number of thermal stages 402 to support subsystems, devices, and samples for cryogenic refrigeration. As a result, the cryostat 400 may position the thermal stages 402 to define a spatial sequence of thermal stages, such as in a linear sequence or an angular sequence. FIG. 4 depicts four thermal stages 402 in an equally spaced linear sequence. In some implementations, the cryostat 400 may include any number and spacing of thermal stages 402 as needed. In the example shown in FIG. 4, the cryostat 400 includes one or more structural supports 404 to position the thermal stages 402 into the spatial sequence of thermal stages. In some examples, the structural supports 404 may be formed of a material having a low thermal conductivity at cryogenic temperatures, e.g., less than 0.5 W/(mK) at or below 50 K, such as a stainless-steel alloy or a glass-epoxy laminate of G10 grade. In this case, the structural supports 404 thus additionally impede a flow of heat between the thermal stages 402. As such, the cryostat 400 may include one or more thermal stages dedicated to a specific temperature during operation. For example, the cryostat 400 may be configured such that each thermal stage operates at a progressively decreasing temperature as a depth of the cryostat increases.

In some implementations, the cryostat 400 may also include one or more refrigeration systems (not shown) thermally coupled to each of the thermal stages 402. For example, the cryostat 400 may include a pulse-tube refrigeration system coupled to a second lowest-temperature thermal stage 406 and a $^3$He/$^4$He dilution refrigeration system thermally coupled to a lowest-temperature thermal stage 408. The refrigeration systems establish specific operating temperatures for the thermal stages to which they are respectively thermally coupled. In some implementations, the refrigeration systems may define a distribution of operating temperatures along the spatial sequence of thermal stages. In some implementations, a pulse-tube refrigeration unit may be configured to optimally extract heat at temperatures to about 4 K and a $^3$He/$^4$He dilution refrigeration unit may be configured to optimally extract heat at temperatures below 1 K.

In the example shown in FIG. 4, a signal conversion system 410 is configured on the lowest-temperature thermal stage 408 of the cryostat 400. In some implementations, the signal conversion system 410 is configured on the same stage with one or more quantum processing units (not shown). In some implementations, the signal conversion system 410 may receive first control signals defined in a first frequency regime and convert to second control signals defined in a second regime for the quantum processing units. In some examples, the first frequency regime is the mm-wave, terahertz, or optical regime and the second frequency regime is the microwave or radio regime. In some implementations, the signal conversion system 410 may be implemented as the signal conversion system 208 as shown in FIG. 2.

In the example shown in FIG. 4, optical fibers 412 carrying the first control signals are used to couple the signal conversion system 410 on the lowest-temperature thermal stage 408 to a signal generator. In some implementations, the signal generator may be configured outside of the insulating walls of the cryostat 400 at a warmer temperature, e.g., room temperature. In some implementations, the signal generator may be coupled to the cryostat 400 through feedthroughs on the insulating walls. In some instances, the feedthroughs are designed for a cryogenic, high vacuum environment. In some instances, the optical fibers 412 may include one or more single-mode optical fibers, one or more multi-mode optical fibers, or a combination. For example, as shown in FIG. 4, the optical fibers 412 are configured separately from the structural supports 404 through the thermal stages 402. In certain implementations, the optical fibers 412 may be arranged or routed in another manner to optically couple the signal generator and the signal conversion system 410.

In some instances, one or more qubit devices in the quantum processing unit may include resonators with different devices coupled to one or more resonators at different frequencies. In some examples, each of the one or more resonators may be coupled along a feedline with an input and output port. In some implementations, the signal conversion system 410 on the lowest-temperature thermal stage 408 may include an electro-optic material, which has optical properties determined by an electric field applied. In some implementations, the electro-optic material of the signal conversion system may be integrated with the output port of the feedline. In some implementations, the optical fibers 412 may be also used to carry a probe signal to the electro-optic material. In some implementations, when a first response signal containing quantum information from the qubit device is received on the output port of the feedline, a change of a local electric field at the output port of the feedline may cause a change in the optical properties of the electro-optic material. In this case, a shift in polarization or amplitude to a probe signal reflected from or transmitted through the electro-optic material, e.g., a second response signal, may be detected. In this case, the first response signal may be converted to the second response signal. In some examples, the second response signal may operate in the same frequency regime as the probe signal. In some implementations, the second response signal may be transmitted by the optical fibers 412 back to a signal receiver, e.g., the signal receiver 212 as shown in FIG. 2.

FIG. 5 is a block diagram showing aspects of an example integrated device 500 in a quantum computing system. As shown in FIG. 5, the integrated device 500 includes a quantum processing unit 504 and a signal conversion system 506. The quantum processing unit 504 and the signal conversion system 506 are integrated on a substrate 502. In some implementations, the quantum processing unit 504 may include an array of qubit devices and may be implemented as the quantum processing unit 102 of FIG. 1. In some implementations, the integrated device 500 may include additional or different features or components, and the components may be arranged in another manner.

In some implementations, the substrate 502 is a silicon substrate. In certain examples, the substrate 502 may include other elemental semiconductor materials such as, for example, germanium. In some instances, the substrate 502 may also include a compound semiconductor such as silicon carbide, gallium arsenic (GaAs), indium arsenide (InAs), and indium phosphide (InP). In certain instances, the substrate 502 may include a compound semiconductor such as silicon germanium (SiGe), silicon germanium carbide (SiGeC), gallium arsenic phosphide (GaAsP), and gallium indium phosphide (GaInP). In some instances, the substrate 502 may also include a superlattice with elemental or compound semiconductor layers. In one embodiment, the substrate 500 includes an epitaxial layer. In some examples, the substrate 502 may have an epitaxial layer overlying a bulk semiconductor or may include a semiconductor-on-insulator (SOI) structure. In some cases, the substrate 502 may be bonded to the quantum processor substrate or electrically connected by vias or bump bonds.

In some implementations, the quantum processing unit 504 may function as a quantum processing unit, a quantum memory, or another type of subsystem. In some implementations, the quantum processing unit 504 may include qubit devices, readout devices, and possibly other devices that are used to store and process quantum information. In some implementations, the quantum processing unit 504 may be controlled by first control signals defined in a first frequency regime, which is in the microwave or radio regime. In some implementations, the first control signals may be delivered to the quantum processing unit 504 from the signal conversion system 506 through RF waveguides 508. In some implementations, the quantum processing unit 504 may be implemented as the quantum processing unit 102 in FIG. 1. In certain implementations, the quantum processing unit 504 may be implemented based on another physical modality of quantum computing.

As shown in FIG. 5, the signal conversion system 506 includes an optical detector system including photodetectors 510 and an optical coupler 512, which are operably coupled together through optical waveguides 514. The optical coupler 512 is optically coupled to optical fibers 512. In some implementations, the optical fibers 520 may carry second control signals from a signal generator defined in a second frequency regime, which is in the mm-wave, terahertz, or optical regime. In some implementations, the photodetectors 510 may be configured to detect the second control signals and to convert the second control signals to the first control signals. In some implementations, the photodetector 510 may include an array of photodiodes. In some implementations, each of the photodiodes may include a Charge Coupled Device (CCD) sensor, a Complementary Metal-Oxide Semiconductor (CMOS) sensor, or any of the other types of photodiodes. In some implementations, the photodetectors 510 are fabricated directly on the substrate 502. In some other instances, the photodetectors 510 may be fabricated separately and then bonded to the substrate 502 via a die bonding process. In this case, the photodetectors 510 may be made of materials (e.g., group III-V materials, group II-VI materials, perovskite-based materials, etc.) which may be different from the substrate 502 and allow the detection of the second control signals at different frequencies with different performances (e.g., response time, responsivity, etc.). In some implementations, the photodetector 510 may output the first control signals for controlling the quantum processing units, which are proportional to the intensity of the second control signals.

In some implementations, the optical coupler 512 may be used to enable communication between the optical fibers 520 and the photodetector 510. In some implementations, the second control signals received from one end of the optical coupler 512 may be redirected to the photodetector 510 through the optical waveguides 514. In some implementations, the optical coupler 512 may include various structures with high coupling efficiency and low reflection losses. For example, an optical coupler 512 may have multiple gratings. In certain instances, geometries, and materials of the gratings may be determined by the second frequency of the second control signals. In some implementations, the optical coupler 512 is fabricated in one or more dielectric layers on the substrate 502. For example, the optical coupler 512 may include trenches and walls created in the one or more dielectric layers. In some instances, the gratings of the optical coupler 512 include diffraction gratings configured with a one-dimensional structure or a two-dimensional array. In some other implementations, components within the signal conversion system 506 may be arranged differently. For example, the optical fiber 520 may be directly coupled to the photodetector 510 without the optical waveguides 514 to reduce real-estate consumption of the substrate 502. For example, the photodetector 510 may be configured above a separate, distinct optical coupler which is configured to receive the optical signals from the optical waveguide 514 and emit to the photodetector 510. In some implementations, the signal conversion system 506 may further include other optical elements, including optical interconnect and wavelength selective switches, filters, dispersion compensation elements, attenuators, gain equalizers, isolators, and circulators.

In some implementations, the first control signals generated by the photodetector may be amplified and transmitted to the quantum processing unit 504 through the RF waveguides 508. In some implementations, the RF waveguide 508 may include one of a co-planar waveguide, a microstrip, or a stripline formed on the substrate 502. In some implementations, the RF waveguide 508 may include superconducting materials, metals, or another type of conductive material.

FIG. 6 is a block diagram showing aspects of an example cryostat 600 in a quantum computing system. As shown in FIG. 6, the example cryostat 600 includes one or more thermal stages 602. In some implementations, the example cryostat 600 may be implemented as the cryostat 400 shown in FIG. 4. In the example shown in FIG. 6, a signal conversion system 612 is configured on the second lowest-temperature thermal stage 606 and a quantum processing unit 610 is configured on the lowest-temperature thermal stage 608. As shown in FIG. 6, optical fibers 614 are used to route first control signals defined in a first frequency regime (e.g., the mm-wave, terahertz or optical regime) received from a signal generator to the signal conversion system 612 and a guided RF medium 616 is used to route second control signals defined in a second frequency regime (e.g., the microwave or radio regime) from the signal conversion system 612 to the quantum processing unit 610. In some implementations, the cryostat 600 may include additional or different elements, and may be arranged in another manner.

In certain implementations, the signal conversion system 612 may be implemented as the signal conversion systems 208, 506 as shown in FIGS. 2 and 5. In some implementations, the signal conversion system 612 may further include one or more RF connectors for coupling between the signal conversion system 612 and the guided RF medium 616. In some implementations, the one or more RF connectors may be coupled to the signal conversion system 612 through RF waveguides. In some examples, the RF waveguides may include co-planar waveguides, microstrips, striplines, or a combination. In some implementations, the second control signals from the signal conversion system 612 may be processed through additional electronic components on the second lowest-temperature thermal stage 606 before being transmitted onto the guided RF medium 616.

In some implementations, the quantum processing unit 610 may be implemented as the quantum processing unit 102 shown in FIG. 1 or another manner. In some implementations, the guided RF medium 616 may include one or more RF connectors and cables including coaxial cables, bifilar cables, or a combination. In some implementations, the guided RF medium 616 may be coupled to the quantum processing unit 610 through an RF assembly, e.g., the RF assembly 700 as shown in FIG. 7, or another manner.

In some instances, each of the one or more qubit devices in the quantum processing unit 610 may include a resonator, e.g., an inductor-capacitor (LC) resonator. In certain instances, a qubit device may be weakly coupled to a different resonator at a different frequency. In some implementations, a qubit device may be coupled to multiple resonators, each with a different frequency. In some examples, each of the multiple resonators may be coupled along a feedline with input and output ports. In some instances, a first response signal on the output port of the feedline may be transmitted to the signal conversion system 612 on the guided RF medium 616. In certain instances, the output port of the feedline may be coupled to the guided RF medium 616 via the RF assembly, e.g., the RF assembly 700 as shown in FIG. 7 or another manner. In some implementations, quantum information of the qubit device may be encoded in first response signals.

In some implementations, the signal conversion system 612 may include one or more signal amplifiers and one or more lasers. In some implementations, the one or more signal amplifiers can receive and amplify the first response signal from the quantum processing unit 610 located at the lowest-temperature thermal stage 608. In some implementations, the signal amplifier may include one or more traveling-wave parametric amplifiers (TWPAs). In some instances, each of the one or more TWPAs may include one or more Josephson junctions to amplify the first response signals. In certain instances, the one or more Josephson junctions may be simultaneously pumped with control signals. For example, each of the one or more Josephson junctions may be powered by high power microwave signals. In some implementations, the signal amplifier of the signal conversion system 612 may include a high-electron-mobility transistor (HEMT) amplifier. In some examples, a HEMT amplifier may include a heterojunction created by two different semiconductor materials with two different band gaps. For example, compound semiconductors containing group III-V materials such as GaAs, AlGaAs, GaN, etc. may be used in the HEMT amplifier. In some examples, the HEMT amplifiers may have high carrier mobility, high gain, low noise value, high switching speed, and frequency responses.

In some implementations, the signal conversion system 612 may include one or more laser sources to convert the first response signals to second response signals defined in the first frequency regime, e.g., the mm-wave, terahertz, or optical regime. In some instances, each of the one or more laser sources may be driven by the amplified first response signals from the HEMT amplifier. In some implementations, each of the one or more laser sources may be directly driven by the amplified first response signals from the TWPAs. In certain implementations, each of the one or more laser sources may be directly driven by the first response signals without being amplified. In some implementations, each of the one or more laser sources may be coupled to respective amplifiers (e.g., TWPAs or HEMT amplifier) with additional elements or configured in a different manner. In some implementations, the second response signals from the one or more laser sources on the signal conversion system 612 may be coupled to the transmission links, e.g., the optical fibers 614, which are used to route the second response signals to a signal receiver, e.g., the signal receiver 212 as shown in FIG. 2.

FIG. 7 is a block diagram showing aspects of an example Radio Frequency (RF) assembly 700 in a quantum computing system. In some implementations, the RF assembly 700 interfaces with a quantum processing unit 720. As shown in FIG. 7, the RF assembly 700 includes RF cables 702, compliant joints 706, and an RF interposer 710. In some implementations, the RF assembly 700 may be integrated with the quantum processing unit 720, e.g., on the lowest-temperature thermal stage 608 of the cryostat 600 as shown in FIG. 6. In some implementations, the RF assembly 700 may enable signal communication between a signal conversion system and the quantum processing unit 720. In some implementations, the RF assembly 700 may include additional and different features or components, and the components may be arranged in another manner.

In some implementations, the compliant joints 706 are electrical conductors that conduct electromagnetic control signals in the microwave or radio regime (e.g., the second control signals as discussed in FIG. 6). In some instances, the compliant joint 706 may direct the control signals to the RF interposer 710. In some implementations, the RF cables 702 may receive the control signals from a signal conversion system, e.g., the signal conversion system 612 configured on the second lowest-temperature thermal stage 606 of the cryostat 600 as shown in FIG. 6. In some implementations, the electrical connection provided by the compliant joints 706 may be mechanically connected or disconnected. For example, the RF cables 702 may make electrical contacts 704 on one side of the compliant joint 706 and the interposer 710 may make electrical contacts 708 on the other side of the compliant joint 706. In some implementations, the electrical contacts 704, 708 may include metal springs, solder balls, conductive adhesives, or a combination. In some implementations, the compliant joint 706 may be enclosed in a dielectric body.

In some implementations, the RF interposer 710 may be fabricated on a semiconductor substrate, e.g., silicon. In some examples, the RF interposer 710 includes one or more interconnections 714. In some instances, the interconnections 714 may be through silicon vias (TSVs) that extend vertically through the RF interposer 710 and may provide electrically conductive pathways between the compliant joint 706 and the quantum processing unit 720. In certain instances, the interconnection 714 may also include patterned metallization layers to spread and route the electrically conductive pathways (e.g., in horizontal directions). In some implementations, the electrical contacts 704, 708, and the interconnections 714 of the RF interposer 710 may include superconducting materials, metals, or another type of conductive material.

Figure 8:
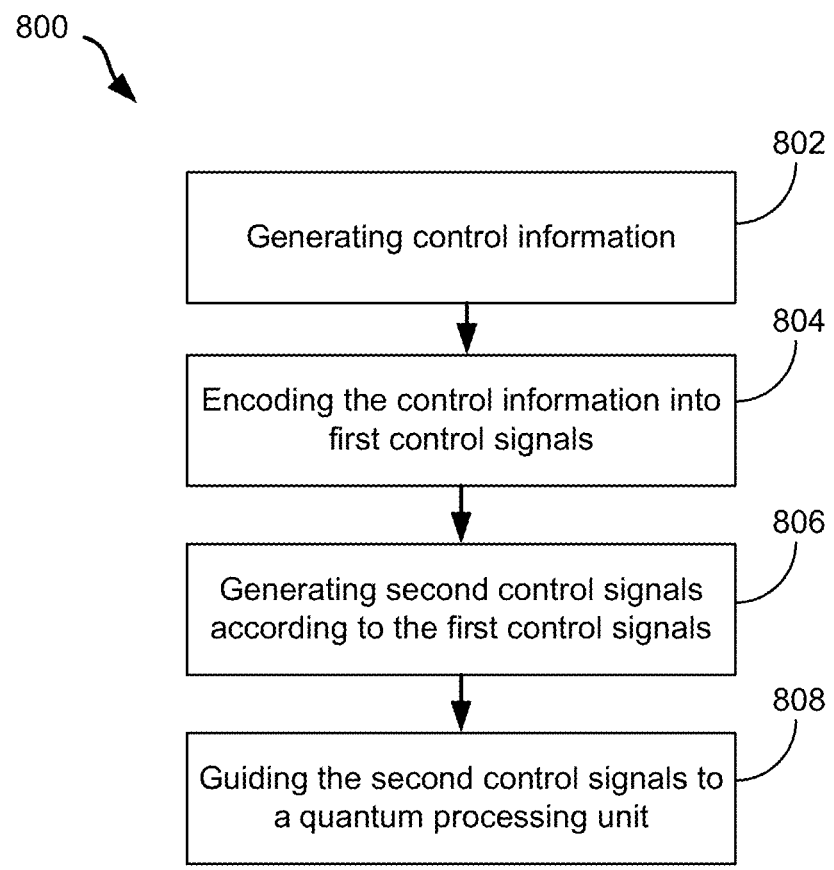
FIG. 8 is a flowchart of an example process for transmitting control signals to a quantum processing unit in a quantum computing system.

FIG. 8 is a flow chart showing an example process 800 for transmitting control signals to a quantum processing unit in a quantum computing system. The example process 800 can be performed, for example, by a quantum computing system. For instance, the example process 800 may be performed by a controller 202, a signal generator 206, and a signal conversion system 208 in the example system 200 shown in FIG. 2. In some cases, the operations in the example process 800 shown in FIG. 8 are implemented as processes to deliver control signals generated by a controller to a quantum processing unit typically located in cryogenic environment. In some implementations, certain operations in the example process 800 may be performed by the signal generators 300, the integrated device 500 and the RF assembly 700 in the cryostats 400, 600 as shown in FIGS. 3-7. The example process 800 may include additional or different operations, including operations performed by additional or different components, and the operations may be performed in the order shown or in another order.

At 802, control information for a quantum processing unit is generated. In some implementations, the control information may be generated by a controller, e.g., the controller 106 of a quantum computing system 103 as shown in FIG. 1. In some implementations, the control information can include operations that may be performed by the quantum processing unit, including quantum logic operations, readout operations, or other type of operations. In some implementations, the control information may be used to operate devices in the quantum processing unit, including qubit devices, readout devices, bias devices, coupler devices, or other types of components in the quantum processing unit, e.g., the quantum processing unit 102 of the quantum computing system 103 as shown in FIG. 1.

At 804, the control information is encoded into first control signals. In some implementations, the first control signals may be defined in a first frequency regime, which is in the mm-wave, terahertz, or optical regime (e.g., about $10^{11}$-$10^{16}$ Hz). In some implementations, the first control signals carrying the control information may be generated by the signal hardware 104 of the quantum computing system 103 as shown in FIG. 1. In some implementations, the signal hardware 104 may include a signal generator. In some implementations, the signal generator may be used for generating the first control signals. In some implementations, the signal generator may be implemented as the signal generators 206, 300 in FIGS. 2 and 3, or a different manner. In some instances, the controller and the signal generator of the signal hardware can operate in a non-cryogenic temperature environment (e.g., room-temperature environment). In certain instances, the signal generator may operate in a cryogenic environment (e.g., in a cryostat).

At 806, second control signals are generated according to the first control signals. In some implementations, the first control signals defined by the first frequency regime may be guided from the signal generator to the signal conversion system through transmission links. In some implementations, the transmission links may include optical fibers with one or more optical multiplexers. In some implementations, the signal conversion system is configured to receive and convert the first control signals to the second control signals defined in a second frequency regime. In some examples, the second frequency regime is the microwave or radio regime (e.g., about $10^6$-$10^{10}$ Hz). In some implementations, the second control signals may be directly used to perform quantum processing operations, for example on qubits, readout devices, tunable couplers, or other types of components in the quantum processing unit.

In some implementations, the signal conversion system may include a photodetector, which may include an array of photodiodes. In some instances, each of the photodiodes has a fast response, e.g., response to the first control signals. In some implementations, the photodetectors may be fabricated directly on a substrate with the quantum processing unit. In some other instances, the photodetectors may be fabricated separately and then bonded to the substrate via a die bonding process. In some implementations, the signal conversion system may be optically coupled to the transmission links through additional optical elements, including an optical coupler and an optical waveguide.

In some implementations, the signal conversion system as a part of the signal hardware may operate in a cryogenic environment. In some implementations, the cryogenic environment may be implemented as the cryostats 400 and 600 as shown in FIGS. 4 and 6. In some implementations, the signal conversion system can be positioned with the quantum processing unit on a lowest-temperature thermal stage of the cryogenic environment. In some implementations, the signal conversion system can be positioned on the second lowest-temperature thermal stage of the cryogenic environment.

At 808, the second control signals are guided to the quantum processing unit. In some implementations, the second control signals are guided to the quantum processing unit through RF waveguides, circuitry, or another types of components. In some implementations, the RF waveguides may include superconducting materials, metals, or other types of conductive materials. In some implementations, the second control signals may be guided to the quantum processing unit through a guided RF medium and a RF assembly, e.g., the RF assembly 700, when the signal conversion system is configured on different thermal stages of the cryogenic environment.

Figure 9:
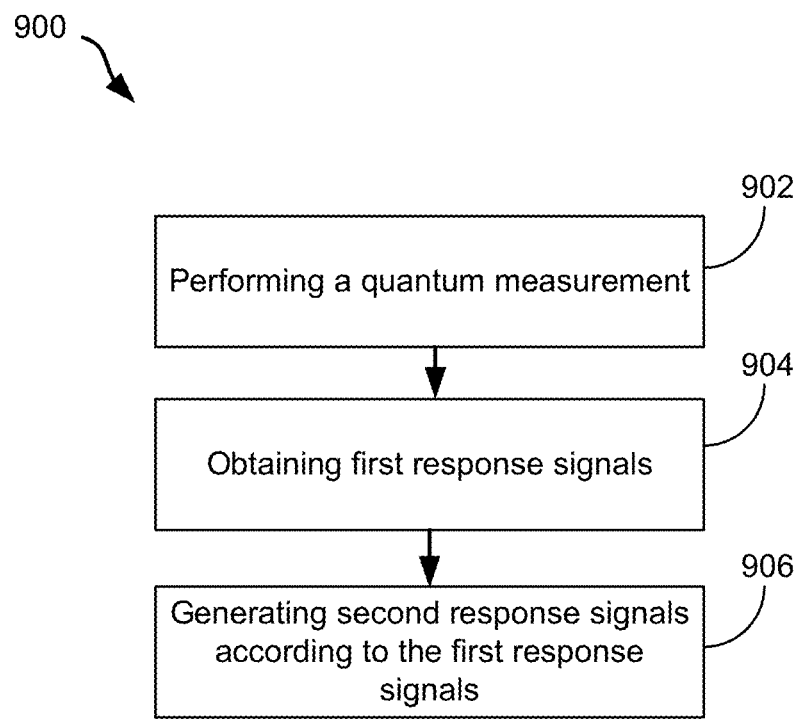
FIG. 9 is a flowchart of an example process for receiving response signals from a quantum processing unit in a quantum computing system.

FIG. 9 is a flow chart showing aspects of an example process 900 for performing a quantum signal readout from a quantum processing unit in a quantum processing system. For instance, the example process 900 may be performed by the signal conversion system 208, the signal receiver 212 and the controller 202 in the example system 200 shown in FIG. 2. In some cases, the operations in the example process 900 shown in FIG. 9 are implemented as processes to readout quantum signals generated by performing a quantum measurement on the quantum processing unit typically located in cryogenic environment. In some implementations, certain operations in the example process may be performed by the RF assembly 700 in the cryostats 400, 600 as shown in FIGS. 4-7. The example process 900 may include additional or different operations, including operations performed by additional or different components, and the operations may be performed in the order shown or in another order.

At 902, a quantum measurement is performed. In some implementations, one or more qubit devices in a quantum processing unit may be measured. In some instances, the quantum processing unit may be implemented as the quantum processing unit 610 as shown in FIG. 6. In some implementations, a control signal (e.g., the second control signals defined in the second frequency regime) may be transmitted into an input port of a feedline and the control signal transmitted to an output port may be measured by scanning the frequency. In some instances, a power of the control signal measured at the output port may be reduced when the frequency of the control signal resonates with the frequency of the resonator. Additionally or alternatively, a coupling to the qubit device may introduce a first frequency shift to the frequency of the resonator. In certain examples, the first frequency shift may depend on the quantum state of the qubit device. In some instances, the first frequency shift in the resonator may introduce a second frequency shift in the control signal measured at the output port of the feedline. In some instances, the power of the control signal can increase at the input port of the feedline, e.g., by inputting more photons into the resonator. In some examples, once the photon number in the resonator gets large enough, the coupling to the qubit device can initiate the quantum measurement. For example, the qubit device may select its zero or one state (e.g., |0⟩ and |1⟩) with a probability depending on its quantum state prior to the measurement.

At 904, first response signals are obtained. In some implementations, quantum information of the qubit device may be encoded in the first response signals. In some implementations, the first response signals may be the second frequency shift of the control signal at the output port of the feedline. In some implementations, the first response signal may include amplitudes of in-phase and quadrature parts of the control signal measured at the output port of the feedline. For example, amplitudes of a zero and 90-degree phase components of the control signal may be used as the first response signals. In certain implementations, the first response signal may include other parameters of the control signal measured at the output port of the feedline.

In some implementations, the first response signals at the output port may be passed through a circulator to prevent the first response signals reflecting back to the resonator. For example, the circulator receives the first response signals at a first port and the first response signals only exits the circulator at a second different port. In some implementations, the circulator may be coupled to the resonator using a waveguide or a transmission line. In some instances, the circulator may be configured and integrated with the qubit devices of the quantum processing unit on lowest-temperature thermal stage of a cryostat in the quantum computing system, e.g., the lowest-temperature thermal stage 610 of the cryostat 600.

In some implementations, the first response signals may be amplified by a signal amplifier. In some instances, the first response signals may be amplified by a low noise amplifier, e.g., TWPAs and HEMT amplifiers. In some implementations, the TWPAs and the HEMT amplifier may be configured as a part of a signal conversion system on a warmer thermal stage of a cryostat in the quantum computing system, e.g., the signal conversion system 612 on the second lowest-temperature thermal stage 606 as shown in FIG. 6. In some implementations, the amplifiers on the second lowest-temperature thermal stage 606 may receive the first response signals from the quantum processing unit via a guided RF medium through a RF assembly, e.g., the RF assembly 700 as shown in FIG. 7, which may be used to interface the guided RF medium (e.g., RF cables) with the quantum processing unit.

At 906, second response signals are generated according to the first response signals. In some implementations, the second response signals are generated according to the amplified first response signals from one or more amplifiers, e.g., the TWPAs and HEMT amplifier. In some implementations, the second response signals are defined in the terahertz or optical regime. In some implementations, the second response signals may be generated by one or more laser sources in a signal conversion system. In some implementations, the one or more laser sources may be implemented as the laser sources in the signal conversion system 612 on the second lowest-temperature thermal stage 606 as shown in FIG. 6 or another manner.

In some implementations, each of the one or more laser sources may output a second response signal which may be guided through an optical multiplexer to combine multiple second response signals. In certain examples, the second response signals may be transmitted from the signal conversion system to a signal receiver, e.g., the signal receiver 212 in the control system 205 outside of the cryogenic environment 230. In some instances, transmission links are used to transmit the second response signals from the signal conversion system to the signal receiver, e.g., the transmission links 207. In certain examples, the transmission links 207 may include one or more optical fibers, e.g., the optical fibers 614 as shown in FIG. 6.

In some implementations, the second response signals may be generated by directly probing the resonator on the quantum processing unit using a probing signal. In some implementations the probing signal may operate in the same frequency regime as the second response signal. In some instances, the probing signal may be guided to the quantum processing unit located at a lowest-temperature thermal stage through the transmission links, e.g., the quantum processing unit 410 on the lowest-temperature thermal stage 408 via the transmission links 412 as shown in FIG. 6. In some instances, the transmission links may incident the probing signal directly on the output port, e.g., a waveguide or the transmission line, of the feedline coupled to the resonator. In some implementations, an electric-optic material, having optical properties that change with the electric field, can be deposited between a signal line and a ground plane at the output port of the feedline. In some implementations, the second response signals may be directly obtained by measuring the probing signal transmitted through or reflected from the electro-optic material. In this case, when the amplitude of the first response signal on the output port of feedline changes, a local electric field applied on the electro-optic material and the optical properties of the electro-optic material are changed. For example, the electro-optic material may change its birefringence or refractive index which causes a shift in polarization or amplitude of the reflected or transmitted probing signal. In some instances, the reflected or transmitted probing signal may be collected and transmitted to the signal receiver via the transmission links.

In some implementations, an optical demultiplexer in the signal receiver may be used to demultiplex the second response signals in the transmission links. In some implementations, a photodiode on the signal receiver may be configured for each of demultiplexed second response signals. In some implementations, the photodiode may be used to decode the second response signals. In some implementations, the photodetectors may be coupled to the optical fibers through a series of optical components, for example, an optical coupler and a waveguide. In some implementations, the coupling between the photodetector on the signal receiver and the optical fibers may be implemented as a signal conversion system, e.g., the signal conversion system 506 as shown in FIG. 5.

In some instances, the first response signals from a qubit device carrying in-phase and quadrature parts of the control signal may be demultiplexed and separately detected by two photodiodes. In some examples, the two photodiodes may be configured in an electrical bridge circuit. In some instances, the photodiodes may be implemented as the photodiodes 510 as shown in FIG. 5. In some examples, the quantum information may be obtained by comparing output amplitudes of the two photodiodes.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media.

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

In a general aspect, signals are converted between regimes in a quantum computing system.

In a first example, a quantum computing system includes: a quantum processing unit, a control system, a transmission medium, and circuitry. The quantum processing unit includes a superconducting circuit, which includes a plurality of qubit devices. The control system includes a signal generator configured to generate a first control signal and encode qubit control information in the first control signal. The transmission medium is configured to couple the signal generator with a signal conversion system. The signal conversion system is configured to: receive the first control signal generated by the signal generator; and generate a second control signal based on the qubit control information encoded in the first control signal. The circuitry is configured to deliver the second control signal to the plurality of qubit devices.

Implementations of the first example may include one or more of the following features. The first control signal is defined in a first regime. The first regime is an optical regime or a terahertz regime. The second control signal is defined in a second regime. The second regime is a radio regime or a microwave regime. The signal conversion system is an optical detector system. The signal conversion system is a terahertz detector system.

Implementations of the first example may include one or more of the following features. The plurality of qubit devices are configured to operate in response to the second control signal in a microwave regime. The signal generator is configured to generate the first control signal in an optical regime. The signal conversion system is configured to generate the second control signal. The plurality of qubit devices is configured to operate in response to the second control signal in a microwave regime. The signal generator is configured to generate the first control signal in a terahertz regime. The signal conversion system is configured to generate the second control signal. The plurality of qubit devices are configured to operate in response to the second control signal in a microwave regime. The signal generator is configured to generate the first control signal in an mm-wave regime. The signal conversion system is configured to generate the second control signal.

The qubit control information represents a control sequence associated with one or more quantum logic gates, and the second control signal is configured to execute the one or more quantum logic gates on the plurality of qubit devices. The quantum processing unit and the signal conversion system reside in a cryogenic environment, and the signal generator resides outside the cryogenic environment. The quantum processing unit operates at a first stage of the cryogenic environment, and the signal conversion system operates at a second, warmer stage of the cryogenic environment. The quantum processing unit and the signal conversion system operate at the coldest stage of the cryogenic environment. The signal conversion system and the circuitry are integrated on a substrate, and the substrate comprises the quantum processing unit. The transmission medium includes one or more optical fibers. The circuitry includes an interposer. The signal conversion system at the second, warmer stage is connected to the quantum processing unit at the first stage via a radio frequency guide. The quantum processing unit is connected to the radio frequency guide via an interposer, and the interposer is integrated on the quantum processing unit.

In a second example, qubit control information for controlling a plurality of qubit devices on a quantum processing unit is generated by operation of a control system. The qubit control information in a first control signal is encoded by operation of a signal generator. The first control signal from the signal generator is transmitted to a signal conversion system through a transmission medium. a second control signal is generated by operation of the signal conversion system according to the first control signal received from the signal generator. The second control signal from the signal generator is delivered to the plurality of qubit devices through circuitry. The quantum processing unit includes a superconducting circuit. The transmission medium is configured to couple the signal generator and the signal conversion system.

Implementations of the second example may include one or more of the following features. The first control signal is defined in a first regime. The first regime is an optical regime, terahertz regime, or an mm-wave regime. The second control signal is defined in a second regime. The second regime is a radio regime or a microwave regime. The signal conversion system is an optical detector system. The signal conversion system is a terahertz detector system. The signal conversion system is an mm-wave detector system.

Implementations of the second example may include one or more of the following features. The plurality of qubit devices are configured to operate in response to the second control signal in the microwave regime. The qubit control information is encoded in the first control signal in an optical regime by operation of the signal generator. The second control signal in a microwave regime is generated by operation of the signal conversion system. The plurality of qubit devices are configured to operate in response to the second control signal in the microwave regime. The qubit control is encoded information in the first control signal in a terahertz or mm-wave regime by operation of the signal generator. The second control signal in a microwave regime is generated by operation of the signal conversion system. The qubit control information represents a control sequence associated with one or more quantum logic gates, and the second control signal is configured to execute the one or more quantum logic gates on the plurality of qubit devices. The quantum processing unit and the signal conversion system reside in a cryogenic environment, and the signal generator resides outside the cryogenic environment. The quantum processing unit operates at a first stage of the cryogenic environment, and the signal conversion system operates at a second, warmer stage of the cryogenic environment. The quantum processing unit and the signal conversion system operate at the coldest stage of the cryogenic environment. The signal conversion system and the circuitry are integrated on a substrate, wherein the substrate comprises the quantum processing unit. The transmission medium includes one or more optical fibers. The circuitry includes an interposer. The second control signal is transmitted, by operation of the signal conversion system, to the quantum processing unit via a radio frequency guide. The quantum processing unit is connected to the radio frequency guide via an interposer, and the interposer is integrated on the quantum processing unit.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A quantum computing system comprising:
   a quantum processing unit comprising a superconducting circuit, the superconducting circuit comprising a plurality of qubit devices;
   a control system comprising a signal generator configured to generate a first control signal and encode qubit control information in the first control signal;
   a transmission medium that connects the signal generator and a signal conversion system, the signal conversion system configured to:
      receive the first control signal transmitted on the transmission medium; and
      generate a second control signal based on the first control signal; and
   circuitry configured to deliver the second control signal to the plurality of qubit devices.

2. The system of claim 1, wherein the first control signal is defined in a first frequency regime.

3. The system of claim 2, wherein the first frequency regime is an optical regime or a terahertz regime.

4. The system of claim 1, wherein the second control signal is defined in a second frequency regime.

5. The system of claim 4, wherein the second frequency regime is a radio regime or a microwave regime.

6. The system of claim 1, wherein the signal conversion system is an optical detector system.

7. The system of claim 1, wherein the signal conversion system is a terahertz detector system.

8. The system of claim 1, wherein the plurality of qubit devices is configured to operate in response to the second control signal in a microwave regime; the signal generator is configured to generate the first control signal in an optical regime; and the signal conversion system is configured to generate the second control signal.

9. The system of claim 1, wherein the plurality of qubit devices are configured to operate in response to the second control signal in a microwave regime; the signal generator is configured to generate the first control signal in a terahertz regime; and the signal conversion system is configured to generate the second control signal.

10. The system of claim 1, wherein the plurality of qubit devices are configured to operate in response to the second control signal in a microwave regime; the signal generator is configured to generate the first control signal in a mm-wave regime; and the signal conversion system is configured to generate the second control signal.

11. The system of claim 1, wherein the qubit control information represents a control sequence associated with one or more quantum logic gates, and the second control signal is configured to execute the one or more quantum logic gates on the plurality of qubit devices.

12. The system of claim 1, wherein the quantum processing unit and the signal conversion system reside in a cryogenic environment, and the signal generator resides outside the cryogenic environment.

13. The system of claim 12, wherein the quantum processing unit operates at a first stage of the cryogenic environment, and the signal conversion system operates at a second, warmer stage of the cryogenic environment.

14. The system of claim 12, wherein the quantum processing unit and the signal conversion system operate at the coldest stage of the cryogenic environment.

15. The system of claim 14, wherein the signal conversion system and the circuitry are integrated on a substrate, and the substrate comprises the quantum processing unit.

16. The system of claim 1, wherein the transmission medium comprises one or more optical fibers.

17. The system of claim 1, wherein the circuitry comprises an interposer.

18. The system of claim 13, wherein the signal conversion system at the second, warmer stage is connected to the quantum processing unit at the first stage via a radio frequency guide.

19. The system of claim 18, wherein the quantum processing unit is connected to the radio frequency guide via an interposer, and the interposer is integrated on the quantum processing unit.

20. A quantum computing method comprising:
generating, by operation of a control system, qubit control information for controlling a plurality of qubit devices in a quantum processing unit, the quantum processing unit comprising a superconducting circuit;
encoding, by operation of a signal generator, the qubit control information in a first control signal;
transmitting the first control signal from the signal generator to a signal conversion system through a transmission medium that couples the signal generator and the signal conversion system;
generating, by operation of the signal conversion system, a second control signal according to the first control signal received from the signal generator; and
delivering the second control signal from the signal conversion system to the plurality of qubit devices through circuitry.

21. The method of claim 20, wherein the first control signal is defined in a first frequency regime.

22. The method of claim 21, wherein the first frequency regime is an optical regime, a terahertz regime, or an mm-wave regime.

23. The method of claim 20, wherein the second control signal is defined in a second frequency regime.

24. The method of claim 23, wherein the second frequency regime is a radio regime or a microwave regime.

25. The method of claim 20, wherein the signal conversion system is an optical detector system.

26. The method of claim 20, wherein the signal conversion system is a terahertz detector system.

27. The method of claim 20, wherein the signal conversion system is a mm-wave detector system.

28. The method of claim 20, wherein the plurality of qubit devices are configured to operate in response to the second control signal in the microwave regime, and the method comprises:
encoding, by operation of the signal generator, the qubit control information in the first control signal in an optical regime; and
generating, by operation of the signal conversion system, the second control signal in a microwave regime.

29. The method of claim 20, wherein the plurality of qubit devices is configured to operate in response to the second control signal in the microwave regime, and the method comprises:
encoding, by operation of the signal generator, the qubit control information in the first control signal in a terahertz regime; and
generating, by operation of the signal conversion system, the second control signal in a microwave regime.

30. The method of claim 20, wherein the plurality of qubit devices is configured to operate in response to the second control signal in the microwave regime, and the method comprises:
encoding, by operation of the signal generator, the qubit control information in the first control signal in an mm-wave regime; and
generating, by operation of the signal conversion system, the second control signal in a microwave regime.

31. The method of claim 20, wherein the qubit control information represents a control sequence associated with one or more quantum logic gates, and the second control signal is configured to execute the one or more quantum logic gates on the plurality of qubit devices.

32. The method of claim 20, wherein the quantum processing unit and the signal conversion system reside in a cryogenic environment, and the signal generator resides outside the cryogenic environment.

33. The method of claim 32, wherein the quantum processing unit operates at a first stage of the cryogenic environment, and the signal conversion system operates at a second, warmer stage of the cryogenic environment.

34. The method of claim 32, wherein the quantum processing unit and the signal conversion system operate at the coldest stage of the cryogenic environment.

35. The method of claim 34, wherein the signal conversion system and the circuitry are integrated on a substrate, wherein the substrate comprises the quantum processing unit.

36. The method of claim 20, wherein the transmission medium comprises one or more optical fibers.

37. The method of claim 20, wherein the circuitry comprises an interposer.

38. The method of claim 33, wherein delivering the second control signal comprises transmitting the second control signal, by operation of the signal conversion system, to the quantum processing unit via a radio frequency guide.

39. The method of claim 38, wherein the quantum processing unit is connected to the radio frequency guide via an interposer, and the interposer is integrated on the quantum processing unit.

* * * * *